(12) United States Patent
Fakoorian et al.

(10) Patent No.: US 12,256,237 B2
(45) Date of Patent: Mar. 18, 2025

(54) ENHANCEMENTS TO SIMULTANEOUS TRANSMIT/RECEPTION IN AN INTEGRATED ACCESS AND BACKHAUL NODE

(71) Applicant: Apple Inc., Cupertino, CA (US)

(72) Inventors: Seyed Ali Akbar Fakoorian, San Diego, CA (US); Chunhai Yao, Beijing (CN); Chunxuan Ye, San Diego, CA (US); Dawei Zhang, Saratoga, CA (US); Haitong Sun, Cupertino, CA (US); Hong He, San Jose, CA (US); Jie Cui, San Jose, CA (US); Oghenekome Oteri, San Diego, CA (US); Sarma V. Vangala, Campbell, CA (US); Wei Zeng, Saratoga, CA (US); Weidong Yang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/754,493

(22) PCT Filed: Apr. 6, 2021

(86) PCT No.: PCT/CN2021/085621
§ 371 (c)(1),
(2) Date: Apr. 4, 2022

(87) PCT Pub. No.: WO2022/213255
PCT Pub. Date: Oct. 13, 2022

(65) Prior Publication Data
US 2024/0098517 A1    Mar. 21, 2024

(51) Int. Cl.
*H04W 16/28*    (2009.01)
*H04W 72/232*    (2023.01)

(52) U.S. Cl.
CPC ......... *H04W 16/28* (2013.01); *H04W 72/232* (2023.01)

(58) Field of Classification Search
CPC . H04W 16/28; H04W 72/232; H04W 52/281; H04W 52/42; H04W 88/085; H04B 7/022; H04B 7/0695
See application file for complete search history.

(56) References Cited

U.S. PATENT DOCUMENTS

| 11,910,483 B2 * | 2/2024 | Abedini ................. H04W 8/22 |
| 2010/0227603 A1 | 9/2010 | Gupta et al. |

(Continued)

FOREIGN PATENT DOCUMENTS

| CN | 107409332 | 11/2017 | |
| CN | 110876209 A * | 3/2020 | ........ H04W 36/0079 |

(Continued)

OTHER PUBLICATIONS

CATT, "NR Physical Layer design for IAB backhaul link", 3GPP TSG RAN WG1 Meeting #94, R1-1808398, Aug. 24, 2018, 8 sheets.

*Primary Examiner* — Kodzovi Acolatse
*Assistant Examiner* — Anindita Sen
(74) *Attorney, Agent, or Firm* — Fay Kaplun & Marcin, LLP

(57) ABSTRACT

A first next generation Node B (gNB) is configured to establish a first backhaul communication link with a second gNB as a parent gNB, schedule at least one of a third gNB or a UE for a UL transmission to the first gNB using UL beam management parameters and UL transmission parameters, indicate to the second gNB first beam management parameters for the second gNB to use for transmitting a DL transmission to the first gNB on the first backhaul link and first DL transmission parameters for the DL transmission so that the DL transmission will be received simultaneously (Continued)

with the UL transmission and when the first beam management parameters and the first DL transmission parameters are determined to be used by the second gNB, receiving the DL transmission from the second gNB simultaneously with the UL transmission from the at least one of the third gNB or the UE.

17 Claims, 11 Drawing Sheets

(56) References Cited

U.S. PATENT DOCUMENTS

| | | | |
|---|---|---|---|
| 2015/0351135 A1 | 12/2015 | Schmidt et al. | |
| 2020/0367134 A1* | 11/2020 | Akl | H04W 40/28 |
| 2022/0110179 A1* | 4/2022 | Sheng | B65D 5/241 |
| 2022/0132432 A1* | 4/2022 | Kim | H04W 52/367 |
| 2022/0248383 A1* | 8/2022 | Park | H04W 72/27 |
| 2022/0248399 A1* | 8/2022 | You | H04L 5/0096 |
| 2023/0071471 A1* | 3/2023 | Park | H04B 17/318 |
| 2023/0353222 A1* | 11/2023 | Sohn | H04B 7/06952 |
| 2024/0137965 A1* | 4/2024 | Zhang | H04W 24/10 |
| 2024/0163808 A1* | 5/2024 | Agarwal | H04B 17/327 |
| 2024/0172031 A1* | 5/2024 | Zhao | H04W 28/0236 |

FOREIGN PATENT DOCUMENTS

| | | | | |
|---|---|---|---|---|
| CN | 116548014 A * | 8/2023 | | H04W 40/12 |
| EP | 3913978 A1 * | 11/2021 | | H04W 24/10 |
| WO | WO-2022205252 A1 * | 10/2022 | | H04W 36/0055 |
| WO | WO-2022205253 A1 * | 10/2022 | | H04L 45/22 |
| WO | WO-2022234818 A1 * | 11/2022 | | |

* cited by examiner

ENHANCEMENTS TO SIMULTANEOUS TRANSMIT/RECEPTION IN AN INTEGRATED ACCESS AND BACKHAUL NODE

BACKGROUND INFORMATION

An integrated access and backhaul (IAB) network may be used in a 5G deployment to provide wireless backhauling for next generation Node Bs (gNBs) that are not directly connected to the 5G core network (5GC). A parent IAB-donor (IAB-parent) may provide wireless backhauling for an IAB-node, which may in turn provide wireless backhauling for a child IAB-node (IAB-child). The IAB-node and the IAB-child may provide wireless access to access user equipment (UEs) and backhaul certain data from the access UEs to the IAB-parent.

An IAB-node in communication with one or more IAB-child nodes and/or one or more access UEs may be specified for simultaneous reception (Rx) on the DL from the IAB-parent and on the UL from either or both of the IAB-child nodes and the access UEs. The IAB-node may also be specified for simultaneous transmission (Tx) on the UL to the IAB-parent and on the DL to the IAB-child nodes and/or access UEs. The IAB-node can support multiplexing of DL transmissions to the IAB-child nodes and/or access UEs and multiplexing of UL transmissions from the IAB-child nodes and/or access UEs.

SUMMARY

Some exemplary embodiments are related to a processor of a first next generation Node B (gNB) configured to perform operations. The operations include establishing a first backhaul communication link with a second gNB, the second gNB having one of a second backhaul communication link with a third gNB or an access link with a user equipment (UE), indicating first beam management parameters for the second gNB to use for receiving a downlink (DL) transmission from the first gNB on the first backhaul link and first DL transmission parameters for the DL transmission, receiving second beam management parameters from the second gNB which modify the first beam management parameters and second DL transmission parameters which modify the first DL transmission parameters, determining whether to use the second beam management parameters and the second DL transmission parameters and when the second beam management parameters and the second DL transmission parameters are determined to be used, scheduling, for the second gNB, the DL transmission in accordance with the second beam management parameters and the second DL transmission parameters so that the DL transmission will be received at the second gNB simultaneously with a UL transmission from the at least one of the third gNB and the UE, wherein the UL transmission is scheduled by the second gNB using UL transmission parameters configured in dependence on the second DL transmission parameters.

Other exemplary embodiments are related to a processor of a first next generation Node B (gNB) configured to perform operations. The operations include establishing a first backhaul communication link with a second gNB as a parent gNB, establishing one of a second backhaul communication link with a third gNB as a child gNB or an access communication link with a user equipment (UE), receiving first beam management parameters from the second gNB for the first gNB to use for receiving a downlink (DL) transmission from the second gNB on the first backhaul link and first DL transmission parameters for the DL transmission, transmitting second beam management parameters to the second gNB which modify the first beam management parameters and second DL transmission parameters which modify the first DL transmission parameters, determining third beam management parameters for the first gNB to use for receiving an uplink (UL) transmission from at least one of the third gNB or the UE and UL transmission parameters for the UL transmission, scheduling the UL transmission for the at least one of the third gNB or the UE so that the UL transmission will be received at the first gNB simultaneously with the DL transmission from the second gNB, wherein the UL transmission is scheduled using the UL transmission parameters configured in dependence on the second DL transmission parameters.

Still further exemplary embodiments are related to a processor of a first next generation Node B (gNB) configured to perform operations. The operations include establishing a first backhaul communication link with a second gNB as a parent gNB, establishing one of a second backhaul communication link with a third gNB as a child gNB or an access communication link with a user equipment (UE), scheduling at least one of the third gNB or the UE for an uplink (UL) transmission to the first gNB using UL beam management parameters and UL transmission parameters, indicating to the second gNB first beam management parameters for the second gNB to use for transmitting a downlink (DL) transmission to the first gNB on the first backhaul link and first DL transmission parameters for the DL transmission so that the DL transmission will be received simultaneously with the UL transmission and when the first beam management parameters and the first DL transmission parameters are determined to be used by the second gNB, receiving the DL transmission from the second gNB simultaneously with the UL transmission from the at least one of the third gNB or the UE.

Additional exemplary embodiments are related to a processor of a first next generation Node B (gNB) configured to perform operations. The operations include establishing a first backhaul communication link with a second gNB, the second gNB having one of a second backhaul communication link with a third gNB or an access link with a user equipment (UE), receiving from the second gNB first beam management parameters for the first gNB to use for transmitting a downlink (DL) transmission to the second gNB on the first backhaul link and first DL transmission parameters, when the first beam management parameters and the first DL transmission parameters are determined to be used by the first gNB, scheduling the DL transmission for the second gNB so that the DL transmission will be received at the second gNB simultaneously with a UL transmission from at least one of the third gNB or the UE.

DETAILED DESCRIPTION

Figure 1:
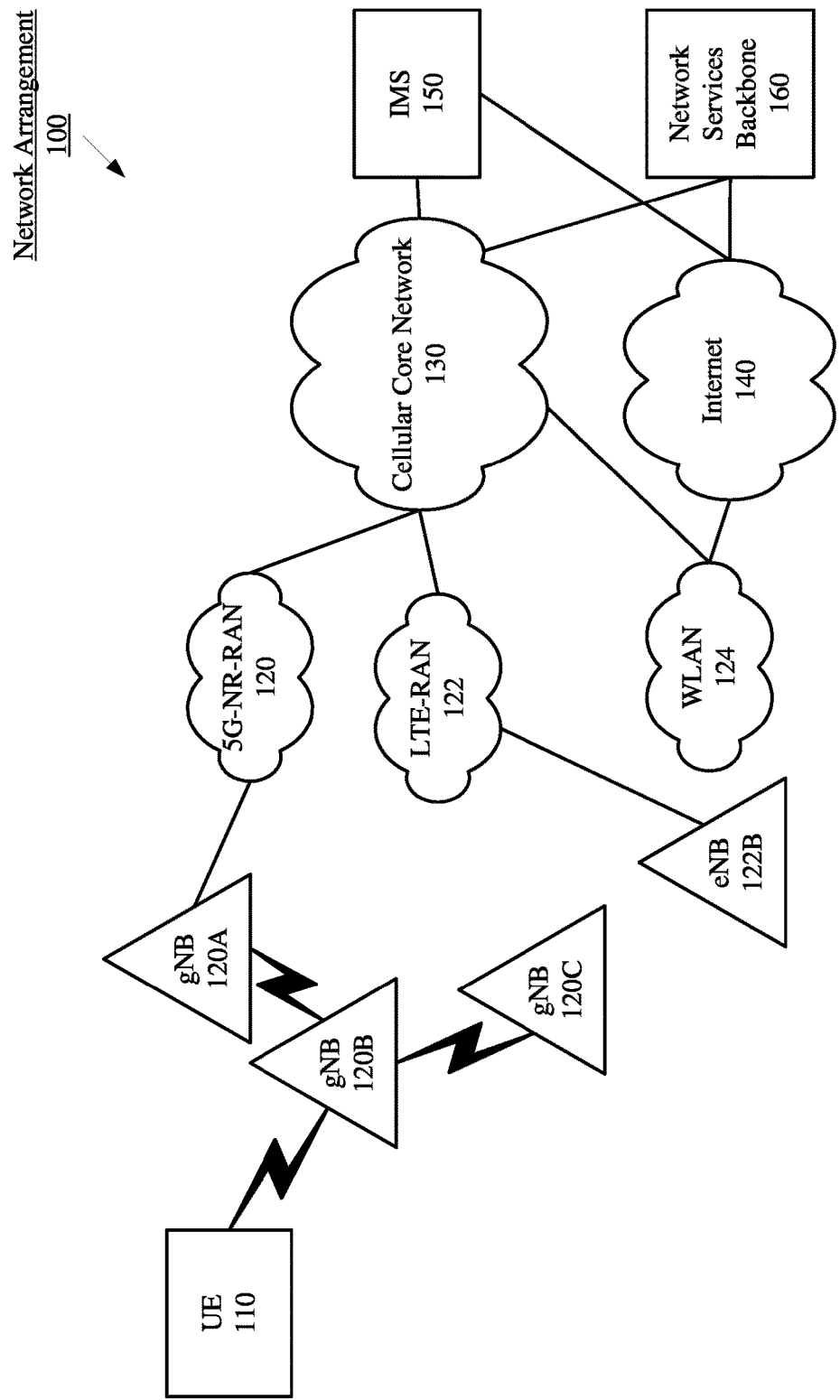
FIG. 1 shows a network arrangement according to various exemplary embodiments.

The exemplary embodiments may be further understood with reference to the following description and the related appended drawings, wherein like elements are provided with the same reference numerals. The exemplary embodiments describe operations supporting simultaneous reception and simultaneous transmission at an integrated access and backhaul (IAB) node in communication with a parent IAB-donor (IAB-parent), one or more child IAB-nodes (IAB-child), and one or more access user equipment (UEs).

According to certain exemplary embodiments, beam management parameters are configured for the components in the IAB network to facilitate the simultaneous transmission/reception at the IAB-node. For example, beam configurations may be indicated to the IAB-node by the IAB-parent, and the IAB-node will subsequently schedule the IAB-child and/or access UE in dependence thereon. In another example, the IAB-node may schedule the IAB-child and/or the access UE for communications with the IAB-node and indicate desired beam parameters to the IAB-parent for simultaneous communications with the IAB-parent. The IAB-parent may accept the indicated parameters so that the IAB-node may receive/transmit simultaneously with the IAB-parent and the IAB child and/or access UE. The IAB-parent may also override the indicated parameters if, for example, the IAB-parent has higher priority traffic to transmit relative to IAB-child or access UE traffic.

According to further embodiments, timing considerations are described for the scheduling of the Tx/Rx at the IAB-node. For example, the IAB-parent may schedule a DL transmission for the IAB-node so that the IAB-node has sufficient time to schedule UL transmissions from the IAB-child and/or the access UE that will be received simultaneously with the DL transmission from the IAB-parent.

Network/Devices

FIG. 1 shows an exemplary network arrangement 100 according to various exemplary embodiments. The exemplary network arrangement 100 includes a user equipment (UE) 110. Those skilled in the art will understand that the UE may be any type of electronic component that is configured to communicate via a network, e.g., mobile phones, tablet computers, smartphones, phablets, embedded devices, wearable devices, Cat-M devices, Cat-M1 devices, MTC devices, eMTC devices, other types of Internet of Things (IoT) devices, etc. It should also be understood that an actual network arrangement may include any number of UEs being used by any number of users. Thus, the example of a single UE 110 is merely provided for illustrative purposes.

The UE 110 may communicate directly with one or more networks. In the example of the network configuration 100, the networks with which the UE 110 may wirelessly communicate are a 5G NR radio access network (5G NR-RAN) 120, an LTE radio access network (LTE-RAN) 122 and a wireless local access network (WLAN) 124. Therefore, the UE 110 may include a 5G NR chipset to communicate with the 5G NR-RAN 120, an LTE chipset to communicate with the LTE-RAN 122 and an ISM chipset to communicate with the WLAN 124. However, the UE 110 may also communicate with other types of networks (e.g., legacy cellular networks) and the UE 110 may also communicate with networks over a wired connection. With regard to the exemplary embodiments, the UE 110 may establish a connection with the 5G NR-RAN 122.

The 5G NR-RAN 120 and the LTE-RAN 122 may be portions of cellular networks that may be deployed by cellular providers (e.g., Verizon, AT&T, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UE 110 may connect to the 5G NR-RAN via at least one of the next generation nodeB (gNB) 120A, the gNB 120B, and/or the gNB 120C. The gNBs 120 may be configured with the necessary hardware (e.g., antenna array), software and/or firmware to perform massive multiple in multiple out (MIMO) functionality. Massive MIMO may refer to a base station that is configured to generate a plurality of beams for a plurality of UEs. Reference to three gNBs 120 is merely for illustrative purposes. The exemplary embodiments may apply to any appropriate number of gNBs.

In addition to the networks 120, 122 and 124 the network arrangement 100 also includes a cellular core network 130, e.g., a 5GC, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

In the system 100 of FIG. 1, the gNBs 120 are in an integrated access and backhaul (IAB) arrangement, wherein only the gNB 120A has direct connectivity with the cellular core network 130, e.g., the 5GC, via the 5G-NR-RAN 120. To be described in further detail below, the gNB 120A is considered a parent IAB, or an IAB-donor, in the IAB arrangement and provides core network access for backhaul traffic from the gNBs 120B and 120C. The gNBs 120B and 120C are considered IAB-nodes and do not have direct connectivity with the core network 130. The gNB 120B is in communication with the gNB 120A via parent links, e.g., a parent UL and a parent DL. The gNB 120C is considered a child IAB of the gNB 120B and is in communication with gNB 120B via child links, e.g., a child UL and a child DL. Additionally, the UE 110 is in communication with the gNB 120B via access links, e.g., an access UL and an access DL. Thus, the gNB 120B, e.g., the IAB-node, may be in simultaneous communication with the gNB 120A, e.g., the IAB-parent, the gNB 120C, e.g., the IAB-child, and the UE 110, e.g., the access UE. As will be described in further detail below, the IAB arrangement may be configured so that the IAB-node transmits/receives simultaneously with the IAB-parent, the IAB-child and/or the access UE.

It will be understood by those skilled in the art that the IAB arrangement described above is only exemplary, and that additional gNBs and/or access UEs may be included in an IAB arrangement. The principles and operations described herein for the exemplary network arrangement 100 may be applied to other arrangements.

Figure 2:
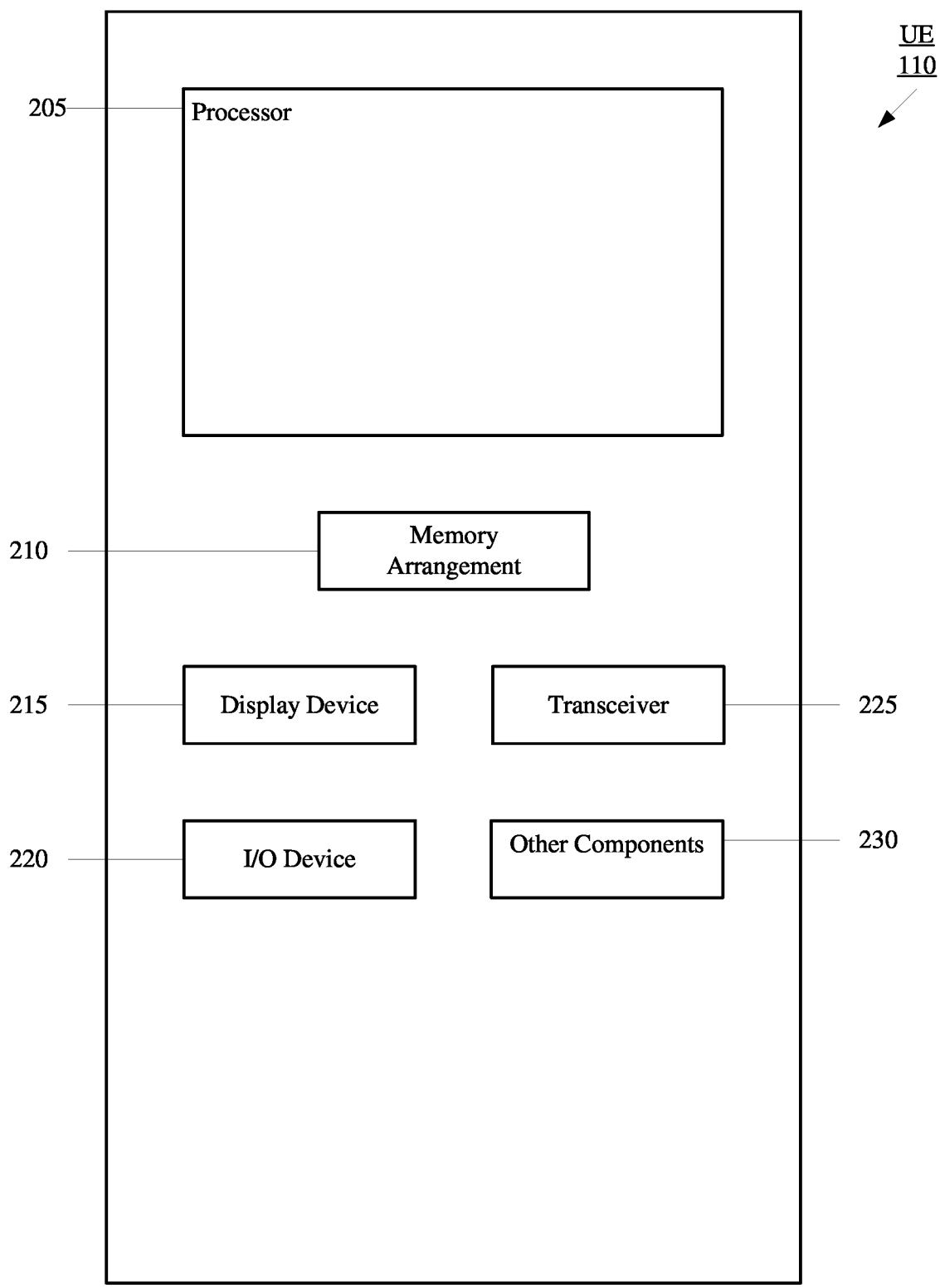
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc.

The processor 205 may be configured to execute operations for accessing the 5G NR-RAN 120 via one or more the gNBs 120A-C. In the exemplary embodiments described herein, the UE 110 may be considered to be connected to the gNB 120B serving as an IAB-node and the UE 110 exchanges communications with the gNB 120B via access links on the UL and DL.

In addition to the processor 205, various UE functionalities may be implemented via a separate incorporated component of the UE 110 or may be a modular component coupled to the UE 110, e.g., an integrated circuit with or without firmware. For example, the integrated circuit may include input circuitry to receive signals and processing circuitry to process the signals and other information. In addition, in some UEs, the functionality described for the processor 205 is split among two or more processors such as a baseband processor and an applications processor. The exemplary embodiments may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G-NR RAN 120, the LTE RAN 122 etc. Accordingly, the transceiver 225 may operate on a variety of different frequencies or channels (e.g., set of consecutive frequencies).

Figure 3:
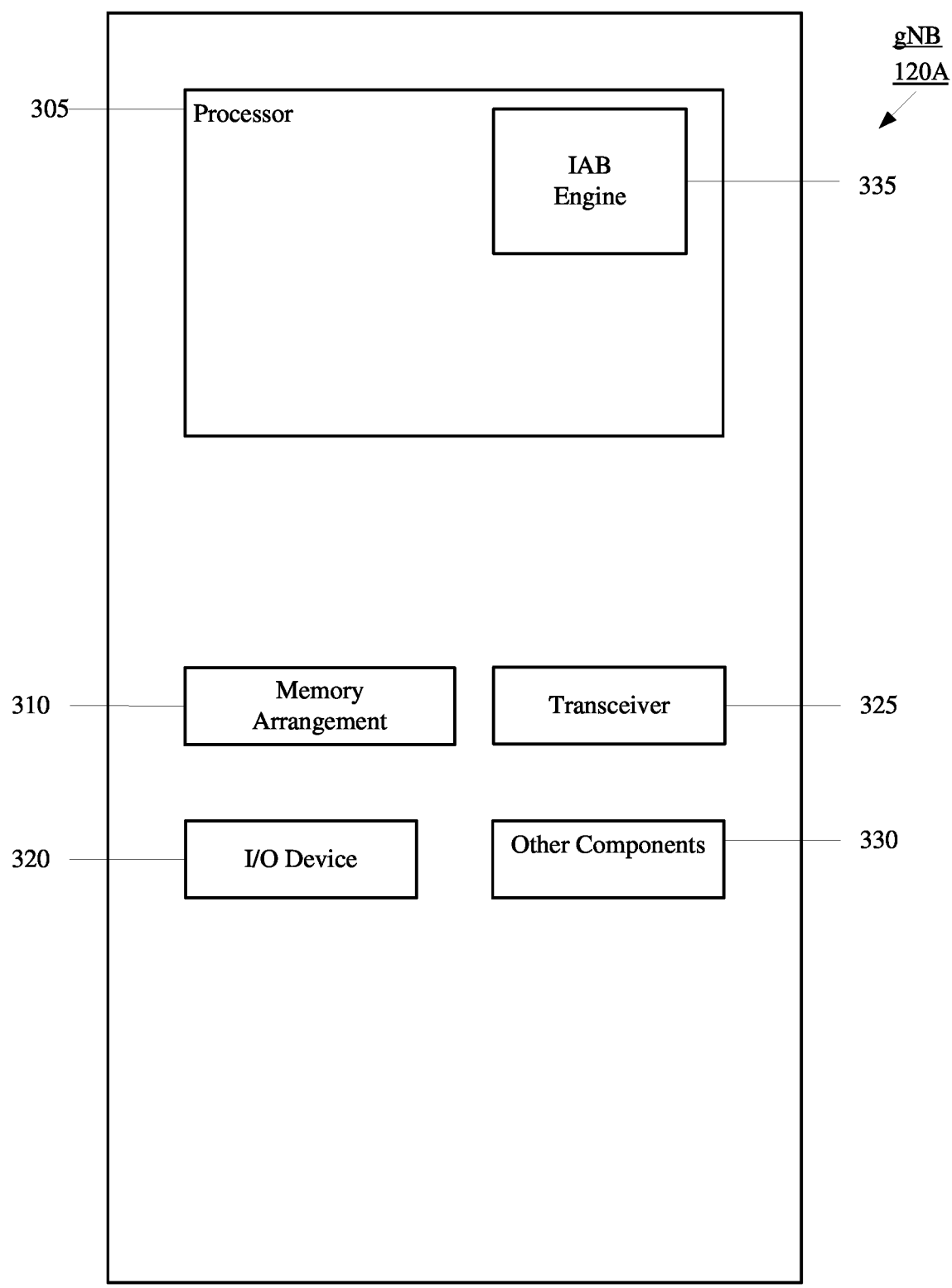
FIG. 3 shows an exemplary network base station according to various exemplary embodiments.

FIG. 3 shows an exemplary network base station, in this example gNB 120A, according to various exemplary embodiments. As noted above with regard to the UE 110, the gNB 120A may represent a serving cell for the UE 110. The gNB 120A may represent any access node of the 5G NR network through which the UEs 110 may establish a connection and manage network operations. The gNB 120A may also represent a parent IAB-donor in an IAB arrangement, as described above with respect to FIG. 1. As will be discussed in greater detail below, the gNBs 120B and 120C may include the same or similar components and perform the same or similar functions as the gNB 120A. However, as will also be described in greater detail below, in the example of FIG. 1, the gNBs 120B and 120C will operate as IAB child nodes.

The gNB 120A may include a processor 305, a memory arrangement 310, an input/output (I/O) device 320, a transceiver 325, and other components 330. The other components 330 may include, for example, an audio input device, an audio output device, a battery, a data acquisition device, ports to electrically connect the gNB 120A to other electronic devices, etc.

The processor 305 may be configured to execute a plurality of engines of the gNB 120A. For example, the engines may include an IAB engine 335. The IAB engine 335 may perform operations for providing a backhaul (parent) node for one or more IAB-nodes. According to the exemplary embodiments described below, the IAB engine 335 performs operations for configuring simultaneous transmission/reception for the IAB-node.

The above noted engines each being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary embodiments may be implemented in any of these or other configurations of a gNB.

The memory 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UE 110 and any other UE in the system 100, e.g., if the gNB 120A serves as a PCell or an SCell to the UE 110. The transceiver 325 may operate on a variety of different frequencies or channels (e.g., set of consecutive frequencies). Therefore, the transceiver 325 may include one or more components (e.g., radios) to enable the data exchange with the various networks and UEs.

The gNB 120B, e.g., the IAB-node described above with respect to FIG. 1, may include similar components as those described above with respect to gNB 120A. However, as will be described in detail below, the IAB-parent and the IAB-node may be configured to execute various different functionalities for configuring the simultaneous transmission/reception at the IAB-node.

The IAB-parent may, for example, configure beam/panel parameters for the IAB-node to use for transmissions/receptions from the various connected components. In another example, the IAB-parent may suggest beam/panel parameters for the IAB-node to use, subject to confirmation or adjustment from the IAB-node. These and other operations performed by the IAB-parent will be described in detail below.

The IAB-node may, for example, receive a configuration for beam/panel parameters for the IAB-node to use and may subsequently schedule transmissions/receptions to/from the IAB-child and/or the access UE in accordance with the indicated parameters. In another example, the IAB-node may propose desired parameters to the IAB-parent that may be accepted by the IAB-parent or reconfigured. These and other operations performed by the IAB-node will be described in detail below.

The gNB 120C, e.g., the IAB-child described above with respect to FIG. 1, may also include similar components as those described above with respect to gNBs 120A and 120B. However, according to the exemplary embodiments, the IAB-child performs transmissions/receptions according to indications from the IAB-node and does not perform specific operations to synchronize transmissions/receptions at the IAB-node. The gNB 120C may provide access links to further UEs.

To be described in further detail below with respect to FIG. 4, each of the IAB-nodes, e.g., the gNBs 120B (IAB-node) and 120C (IAB-child), may be considered to include two separate units, one being configured for "upstream" communications in the IAB linkage, referred to as a mobile termination (MT) unit, and the other being configured for "downstream" communications in the IAB linkage, referred to as a distributed unit (DU). That is, for the IAB-node (gNB 120B), an IAB-MT is configured for communications with the parent-IAB including receiving DL communications and transmitting UL communications, and an IAB-DU is configured for communications with the IAB-child (gNB 120C) and any access UEs including transmitting DL communications and receiving UL communications. For the IAB-child (gNB 120C), the MT is configured for communications with the IAB-node (gNB 120B) and the DU is configured for communications with access UEs. The IAB-parent (gNB 120A) at least includes the DU for communications with the IAB-MT but may further include the MT for communications with a further IAB-parent. However, in the exemplary embodiments described herein, only the DU functionality for the parent-IAB is considered.

IAB Enhancement

An integrated access and backhaul (IAB) network may be used in a 5G deployment to provide a wireless backhauling functionality for next generation Node Bs (gNBs) that are not directly connected to the 5G core network (5GC). A parent IAB-donor (IAB-parent) may provide wireless backhauling for an IAB-node, which may in turn provide wireless backhauling for a child IAB-node (IAB-child). The IAB-node and the IAB-child may provide wireless access to access user equipment (UEs) and backhaul certain data from the access UEs to the IAB-parent.

Figure 4:
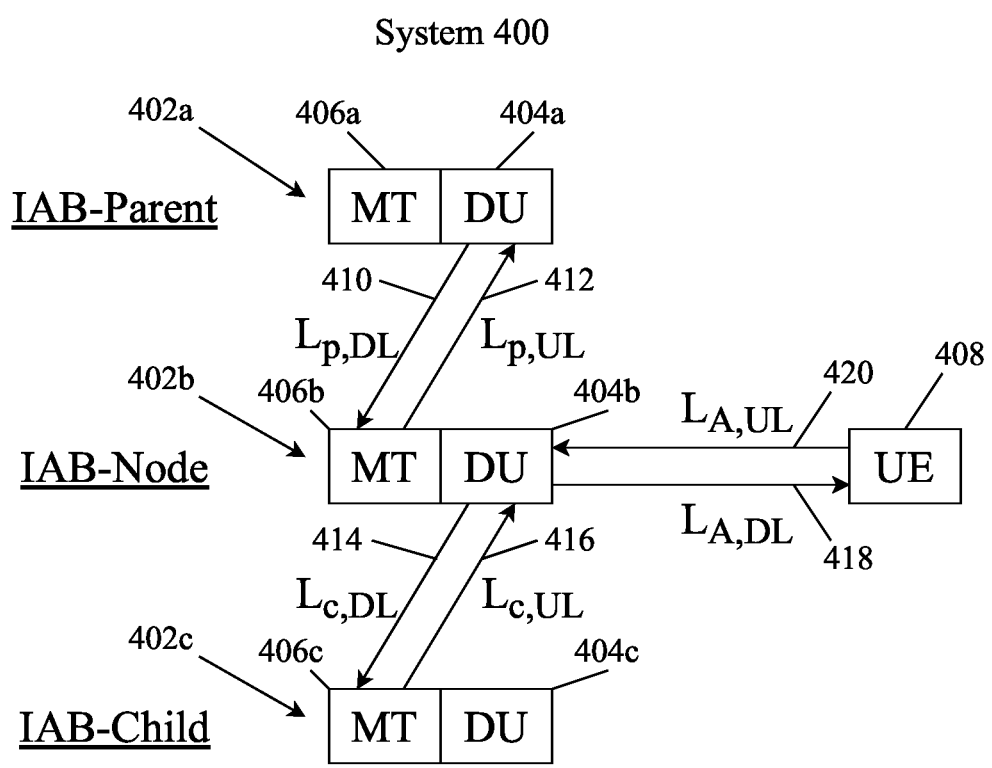
FIG. 4 shows a system for integrated access and backhaul (IAB) comprising a plurality of next generation NodeBs (gNBs).

FIG. 4 shows a system 400 for integrated access and backhaul (IAB) comprising a plurality of next generation NodeBs (gNBs) 402. Three gNBs 402 are shown in FIG. 4, however the IAB system may include any number of gNBs. In this example, the gNB 402a serves as the parent IAB-donor (IAB-parent) and has fiber connectivity to the 5G core network (5GC) and wireless connectivity to the gNB 402b (IAB-node). The IAB-parent 402a provides an interface to the 5GC and wirelessly backhauls UE access traffic for UEs in communication with the gNB 402b. The gNB 402b is an IAB-node and has wireless connectivity to the gNB 402a, the gNB 402c, and an access UE 408. The gNB 402c is a child IAB-node and has connectivity to the gNB 402b. The IAB-nodes 402b, 402c support wireless access to UEs and wirelessly backhaul the access traffic to the IAB-parent 402a.

Each of the gNBs 402 in the system 400 is equipped with IAB-node functionality, and thus includes a distributed unit (DU) 404 and a mobile termination (MT) 406. In the system 400, the IAB-donor 402a is shown as including an MT 406a, indicating that it may itself be an IAB-node having connectivity to its own IAB-parent. However, in the present embodiments, the IAB-donor is considered a single logical node comprising a set of functions such as a DU, a central unit-control plane (CU-CP), a central unit-user plane (CU-UP), and potentially other functions.

In the system 400, the DU 404a of the IAB-parent 402a communicates with the MT 406b of the IAB-node 402b on a link 410, e.g., the parent downlink ($L_{p,DL}$) and a link 412, e.g., the parent uplink ($L_{p,UL}$). The DU 404b of the IAB-node 402b communicates with the MT 406c of the IAB-child 402c on a link 414, e.g., the child downlink ($L_{c,DL}$) and a link 416, e.g., the child uplink ($L_{c,uL}$). The DU 404b of the IAB-node 402b additionally communicates with the access UE 408 on a link 418, e.g., the access downlink ($L_{A,DL}$) and a link 420 e.g., the access uplink ($L_{A,UL}$).

The 3GPP standard document TS 38.874, Sec. 7.3 relates to specifications for simultaneous Tx/Rx for an IAB-node. In the case of transmitter-side spatial division multiplexing (SDM) or frequency division multiplexing (FDM), an IAB-node is specified for simultaneously transmitting in the DL (to an access UE and/or child IAB-node) and transmitting in the UL (to a parent IAB-node). In the case of receiver-side SDM/FDM, an IAB-node is similarly specified for simultaneously receiving in the DL (from a parent node) and receiving in the UL (from an access UE and/or child IAB-node). An IAB-node can support the multiplexing of DL transmissions to access UEs and child IAB-nodes and the multiplexing of UL transmissions from access UEs and child IAB-nodes, using existing MU-MIMO or sectorization mechanisms.

Rel-17 work item objectives have been proposed to enhance IAB operations. A first objective includes specifying enhancements to the resource multiplexing between child and parent links of an IAB node, including support of simultaneous operation (transmission and/or reception) on the child and parent links (i.e., MT Tx/DU Tx, MT Tx/DU Rx, MT Rx/DU Tx, MT Rx/DU Rx). A second objective includes specifying IAB-node timing mode(s), extensions for DL/UL power control, and CLI and interference measurements of BH links, as needed, to support simultaneous operation (transmission and/or reception) on the child and parent links.

Figure 5:
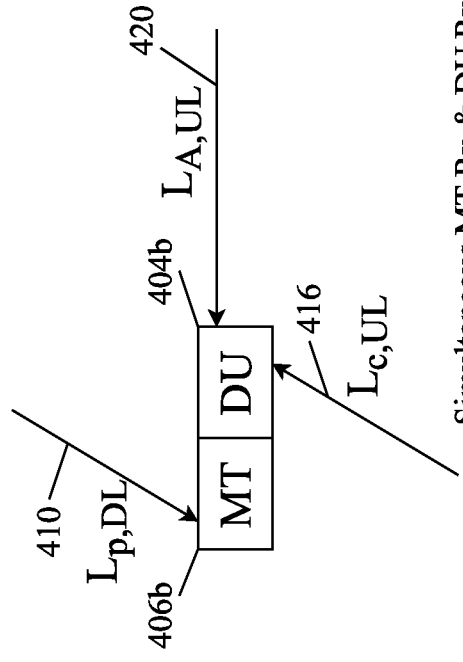
FIG. 5 shows diagrams for simultaneous operation at an IAB-node.
Figure 5:
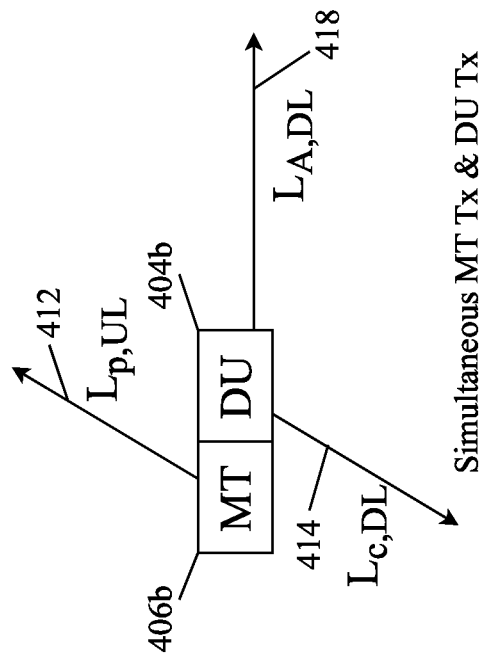
Figure 5:
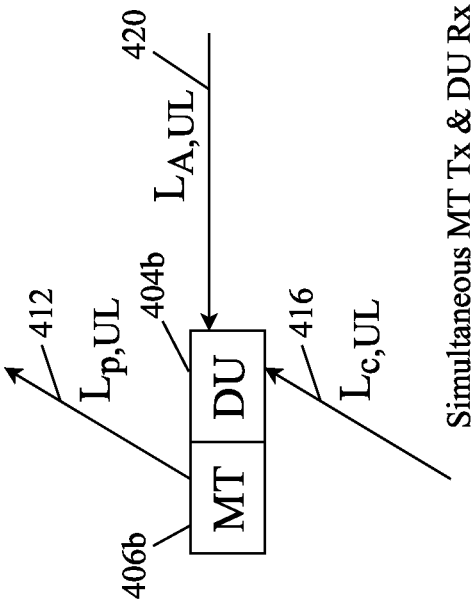
Figure 5:
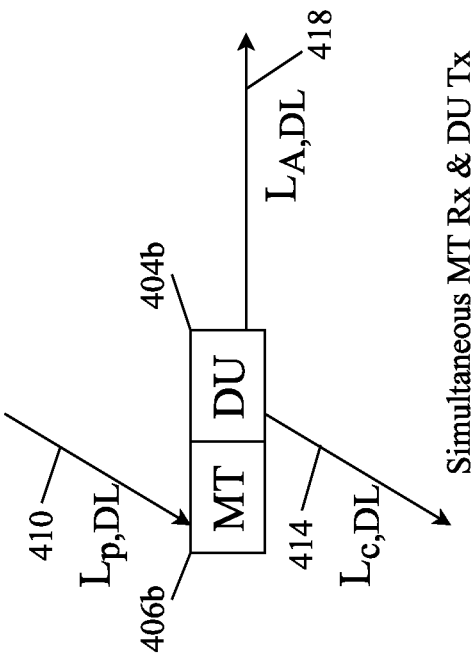

FIG. 5 shows diagrams for simultaneous operation at an IAB-node, e.g., IAB-node 402b of FIG. 4. Diagram 502 shows simultaneous MT transmission (MT Tx) to an IAB-parent on the parent UL 412 and DU transmission (DU Tx) to an access UE on the access DL 418 and to an IAB-child on the child DL 414. Diagram 504 shows simultaneous MT reception (MT Rx) from an IAB-parent on the parent DL 410 and DU reception (DU Rx) from an access UE on the access UL 420 and from an IAB-child on the child UL 416. Diagram 506 shows simultaneous MT Rx and DU Tx and diagram 508 shows simultaneous MT Tx and DU Rx.

From TR 38.874 Sec. 7.4, the following cases of transmission timing alignment have been considered. In Case 1, DL-Tx transmission timing is aligned across all IAB-nodes. In Case 2, UL-Rx transmission timing is aligned across all IAB-nodes. In Case 6, DL-Tx transmission timing is aligned across all IAB-nodes (like Case 1), and additionally UL transmission timing of an IAB-node (to the IAB-parent) is aligned with the DL transmission timing of the IAB-node. Thus, within the IAB node, DU-Tx & MT-Tx are time aligned, as described above with respect to diagram 502 of FIG. 5. In Case 7, UL-Rx transmission timing is aligned across all IAB-nodes (like Case 2), plus UL Rx transmission timing is aligned with the DL reception transmission timing of the IAB-node (from the IAB-parent). Thus, within the IAB node, DU-Rx & MT-Rx are time aligned, as described above with respect to diagram 504 of FIG. 5.

Additionally, how to manage resources in the spatial domain is to be considered. The exemplary embodiments described herein include various solutions with respect to 1) dynamic signaling between parent and child nodes for using/restricting/sharing antenna panels/beams, and 2) beam management/multi-panel enhancements for simultaneous operations. Case 7 timing is supported in Rel-17 for IAB-nodes operating in multiplexing scenario Case 2 (simultaneous DU-Rx/MT-Rx) and that Case 7 timing is supported with symbol level alignment without explicit support for slot level alignment.

SDM with Case 7 Simultaneous Rx

For a successful spatial division multiplexing (SDM) reception, the IAB-parent DU and the IAB-node DU should be aware of the desired beam/panel and the used beam/panel for the other side. In one example, if the IAB-parent DU wishes to schedule a PDSCH to the IAB-node MT, ideally it should have some prior indication from the IAB-node about which panel/beam is desired for the PDSCH transmission, in cooperation with the IAB-DU simultaneously receiving from the access UE or the IAB-child (backhaul). Thus, according to various exemplary embodiments described below, operations are described for indicating beam/panel parameters from the IAB-parent to the IAB-node and from the IAB-node to the IAB-parent.

In further exemplary embodiments, the parent IAB-DU may indicate the reception beam/panel at the IAB-node, e.g., through a TCI index, and the IAB-DU will consequently indicate to the child IAB-MT and/or access UE the SRI index for PUSCH transmission from child IAB-MT and/or access UE.

In the exemplary embodiments mentioned above, beam management at the IAB receivers and a scheduling timeline to meet simultaneous reception at the IAB node (DU & MT) is considered.

In the following description, various communications will be described as occurring between the IAB-parent and the IAB-node, between the IAB-node and the IAB-child, and between the IAB-node and the access UE. It will be understood by persons skilled in the art that all transmissions between the IAB-parent and the IAB-node are performed between the IAB-parent DU and the IAB-node MT, unless indicated otherwise, and all transmissions between the IAB-node and the IAB-child and/or access UE are performed between the IAB-node DU and the IAB-child MT and/or the access UE, unless indicated otherwise.

Beam/Panel Indication

According to various embodiments described herein, the following options are available with respect to indicating reception beams/panels for the IAB-node, to be described in further detail below.

In the first two options, the IAB-parent initiates the process by indicating beam/panel information to the IAB-node, the IAB-node then indicating beam/panel information to the IAB-child and/or access UE based on the information received from the IAB-parent. In the third option, the IAB-node initiates the process by indicating desired beam/panel information to the IAB-child and/or access UE for UL Rx and indicating beam/panel information to the IAB-parent for DL Rx. In the fourth option, any of the preceding options may be used based on a communication link and/or priority.

Thus, two categories for configuring simultaneous Tx/Rx at the IAB-node may be considered, i.e., IAB-parent initiated and IAB-node initiated.

In the first option, the parent IAB-DU indicates to the IAB node a unified TCI framework including the reception beams/panels for both the parent DL and the child and/or access UL. Using the indicated Rx information for the child/access UL, the IAB-node then indicates to its child IAB and/or access UE about the transmit beam/panel to use for UL transmissions. The IAB-node may indicate this information through, e.g., a SRS resource indicator (SRI) for PUSCH.

In the second option, the IAB-parent indicates to the IAB-node reception beam/panel information only for the parent DL. Then, the IAB-node will choose the reception beam/panel for the child/access UL having a minimal impact on the parent DL, and then indicates to its child IAB and/or access UE about the transmit beam/panel to use for UL transmissions, e.g., through SRI for PUSCH.

In the third option, the IAB-node indicates to the IAB-child and/or the access UE information for the transmit beam/panel to use for UL transmissions. The IAB-node then selects a transmit beam/panel for the parent DL and indicates parameters to the IAB-parent so that the IAB-node will simultaneously receive from the IAB-parent and the IAB-child and/or access UE. This option will be discussed further below with respect to the method 800 of FIG. 8.

In the fourth option, the choice between the above options can be based on communication link and/or priority. For example, the IAB-node may initiate the process by scheduling an IAB-child on the child UL and/or a UE on the access UL and indicating desired beam parameters to the IAB-parent for the parent DL. However, if traffic pending on the parent DL is determined by the IAB-parent to have a higher priority than traffic pending on the child/access UL, then the IAB-parent may override the desired parameters and signal different parameters to the IAB-node.

For the various options discussed above, the beam/panel parameters to be used in the IAB communications may be indicated in the following manners.

According to some exemplary embodiments, options are considered for a beam/panel parameter indication from the IAB-parent to the IAB-node. These embodiments are applicable to either one of the first two options discussed above, where the IAB-parent indicates Rx beams/panels for the parent DL directly (as shown in both options 1 and 2) and further indicates Rx beams/panels for the child UL and/or access UL directly (for the first option) or indirectly (for the second option).

In these exemplary embodiments, the indication from the IAB-parent can be dynamic and/or semi-static. For a dynamic indication, the beam information may be indicated via, e.g., the TCI index in DCI for scheduling the PDSCH on the parent DL. For a semi-static indication, the beam information may be indicated via, e.g., the MAC-CE/RRC transmitted to the IAB-node MT or through the F1 interface to the IAB-node DU for semi-static/periodic transmissions from the parent-IAB DU, such as periodic CSI-RS, SSB, SPS-PDSCH.

According to other exemplary embodiments, options are considered for a beam/panel parameter indication from the IAB-node to the IAB-parent. These exemplary embodiments may be applicable to the third option discussed above, where the IAB-node indicates desired Rx beams/panels for the parent DL.

In these exemplary embodiments, the indication to the IAB-parent can be dynamic and/or semi-static. For a dynamic indication, the beam information may be indicated via, e.g., an uplink control information (UCI) transmission from the IAB-node to the IAB-parent. For a semi-static indication, the beam information may be indicated via, e.g., the MAC-CE from IAB-MT or through F1 interface from IAB-DU for semi-static/periodic UL receptions at IAB-DU, like periodic SRS, CG-PUSCH. In some exemplary embodiments, the IAB-node may transmit a scheduling request (SR) or initiate a physical random access channel (PRACH) to indicate to the IAB-parent a desired receiving beam on the parent DL.

In any of the exemplary embodiments discussed above, regardless of the direction of the indication (from IAB-parent to IAB-node or from IAB-node to IAB-parent), the indication may be for either desired beams/panels or, alternatively, the indication may be for beams/panels that shall be avoided by the other side.

Timeline Considerations

To achieve a simultaneous reception at an IAB node, i.e., DU-Rx & MT-Rx, the following options are available for configuring a timeline for the Rx transmissions to achieve simultaneous reception at the IAB-node.

Transmissions may be scheduled in the IAB arrangement based on the following parameters. K0 relates to the offset between the slot where DCI (PDCCH) is received and the slot where PDSCH data is scheduled. K1 relates to the offset between the slot where PDSCH data is scheduled and the UL slot where feedback for the scheduled PDSCH is sent. K2 relates to the offset between the slot where DCI is received for UL scheduling and the slot where PUSCH data is transmitted. A start and length indicator value (SLIV) relates to a start symbol and a number of consecutive symbols for the PDSCH.

In a first option, the IAB-parent (parent IAB-DU) schedules the IAB-node (IAB-MT) for a parent DL reception, e.g., a PDSCH, where a K0 value and SLIV are assigned such that the IAB-node (IAB-DU) has enough time to schedule the IAB-child on the backhaul child UL and/or the access UE on the access UL, so that UL transmissions are received at the IAB-node at the same time as DL transmissions. In other words, the K0 value indicated by the IAB-parent for the parent DL transmission is large enough so that the IAB-DU may schedule a child MT or an access UE for a UL transmission so that the K2 value for the UL transmission fits within the K0 value indicated for the parent DL.

Figure 6A:
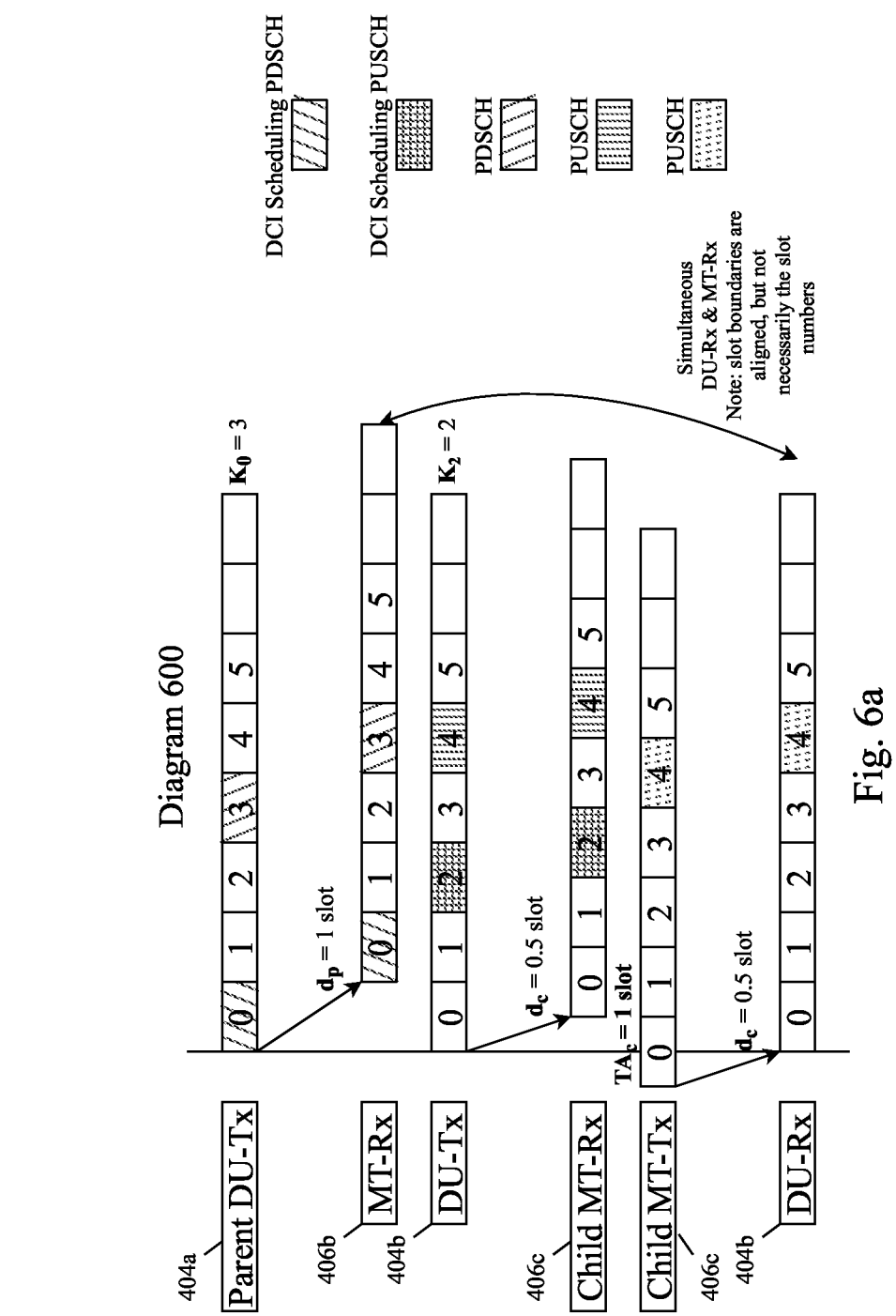
FIGS. 6a-6d show slot diagrams for scheduling simultaneous reception at an IAB-node in an IAB arrangement.

FIG. 6a shows a first slot diagram 600 for scheduling simultaneous reception at an IAB-node in an IAB arrangement. The diagram 600 will be described with regard to the system 400 of FIG. 4. In this exemplary diagram, the IAB arrangement includes a parent IAB-donor, e.g., IAB-parent 402a, an IAB-node, e.g., IAB-node 402b, and a child IAB-node, e.g., IAB-child 402c. However, the communications described between the IAB-node and the IAB-child may also describe communications between the IAB-node and an access UE, e.g., access UE 408, which may be performed concurrently with the communications between the IAB-node and the IAB-child. Thus, the operations described below may be used to synchronize receptions at the IAB-node for all components with which the IAB-node is in communication, e.g., the IAB-parent, the IAB-child, and the access UE. In addition, exemplary values are provided for some of the parameters described above, e.g., K0=3, K2=2.

In the slot diagram 600, the IAB-parent DU 404a schedules a PDSCH for Rx at the IAB-node MT 406b by transmitting a PDCCH/DCI in slot 0 of the parent DU-Tx frame. The DCI is transmitted on the parent DL 410 and is received at the IAB-node MT 406b. The parent/node propagation delay (dp), in this example, is assumed to be 1 slot, and the IAB-node MT-Rx frame is offset by 1 slot relative to the parent DU-Tx frame. The DCI transmission from the IAB-parent DU 404a in slot 0 and the DCI reception at the IAB-node MT 406b in slot 0 of the node MT-Rx frame is shown in FIG. 6a with the same cross-hatching.

The IAB-node MT 406b notifies the IAB-node DU 404b, which then schedules a PUSCH for the IAB-child MT 406c by transmitting a PUCCH in slot 2 of the IAB-node DU-Tx frame. The PUCCH is transmitted on the child DL 414 and is received at the child MT 406c. The node/child propagation delay (dc), in this example, is assumed to be 0.5 slot, and the IAB-child Mt-Rx frame is offset by 0.5 slot relative to the IAB-node DU-Tx frame. The PUCCH transmission from the IAB-node DU 404b in slot 2 and the PUCCH reception at the IAB-child MT 406c in slot 2 of the child MT-Rx is shown in FIG. 6a with the same cross-hatching.

Based on the node/child propagation delay, the IAB-child MT 406c applies a timing advance of 0.5 slot for its MT-Tx frame. The IAB-child MT 406c then transmits on the scheduled PUSCH in slot 4 via the child UL 416. The PUSCH transmission on the child UL 416 is received at the IAB-node DU 404b in slot 4 of the IAB-node DU Rx frame, simultaneously with the PDSCH transmission on the parent DL 410, which is received in slot 3 of the IAB-node MT-Rx frame. As above, the PDSCH transmission on the parent DL 410 and receipt at the IAB-node are shown with the same cross-hatching, and the PUSCH transmission on the child UL 416 and receipt at the IAB-node are shown the same cross-hatching.

As shown above, the IAB-parent 402a schedules the PDSCH on the parent DL 410 so that there is sufficient time for the IAB-node 402b to schedule the PUSCH for the child UL 416 and simultaneously receive the transmissions from the parent 402a and the child 402c. Further, in this example, the slot boundaries are aligned for the MT-Rx and the DU-Rx, because of the parent/node propagation delay being 1 slot. However, the slot boundaries are not aligned.

As mentioned above, in this embodiment, only the child 402c is shown having communications with the IAB-node DU 404b. However, a similar procedure may be used for the IAB-node DU 404b to schedule a UE, e.g., the access UE 408, for a PUSCH on the access UL 418 and receive the PUSCH on the access UL 418 simultaneously with the PDSCH on the parent DL 410 and the PUSCH on the child UL 416.

As mentioned above, the slot boundaries for the Rx at the IAB-node are aligned, although the slot numbers are not aligned. However, in the example shown below, the slot boundaries need not be aligned if slot border crossing is allowed for the PDSCH transmission from the IAB-parent 402a.

Figure 6B:
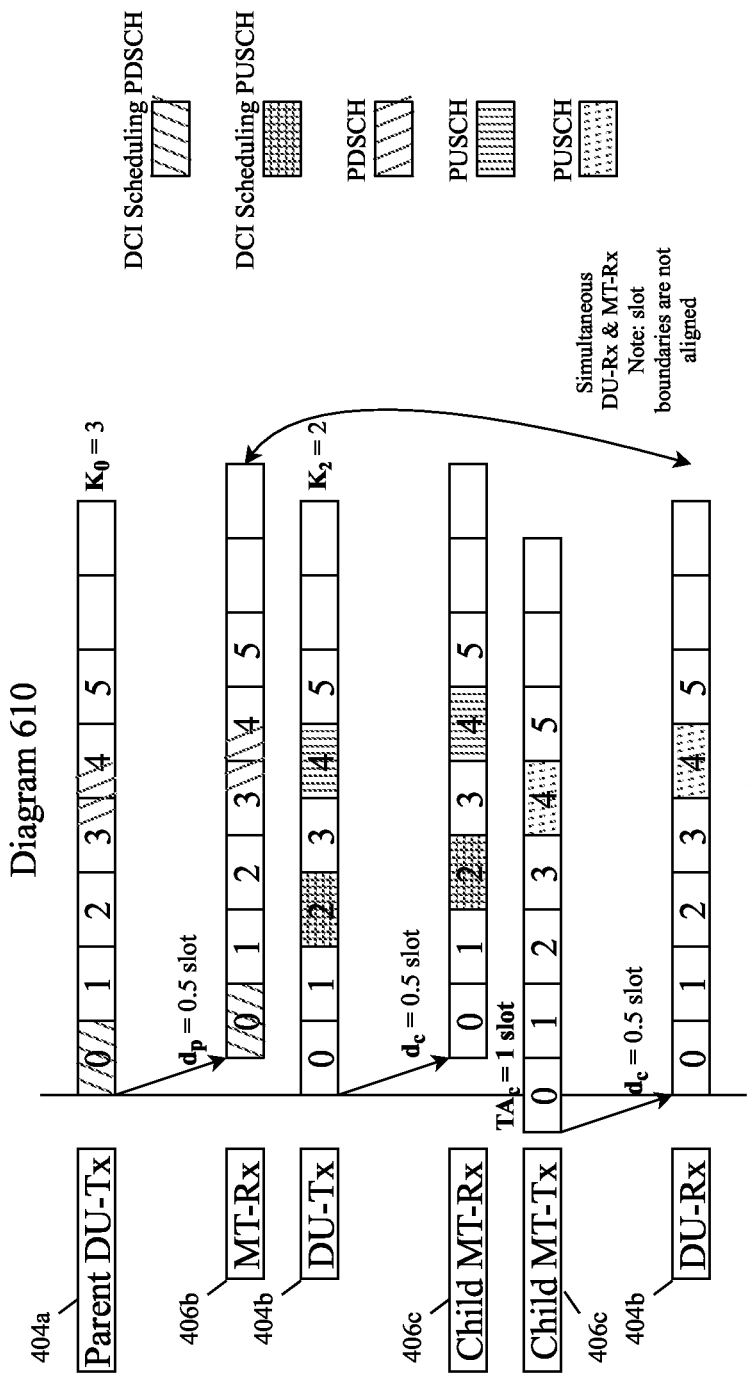

FIG. 6b shows a second slot diagram 610 for scheduling simultaneous reception at an IAB-node in an IAB arrangement. Similar to the first slot diagram 600, the second slot diagram 610 will be described with regard to the system 400 of FIG. 4. Similar to FIG. 6a above, the same cross-hatchings are used in the diagram 610 to show transmissions from one component and receptions at another component.

In this embodiment, the same operations are performed as described above with respect to FIG. 6a. However, in this embodiment, the parent/node propagation delay (dp) is only 0.5 slot and, consequently, the slot boundaries are not aligned for the parent DU-Tx frame and the node MT-Rx frame. Thus, in this example, it is assumed that slot border crossing is allowed for the PDSCH from the IAB-parent.

In a second option, the IAB-DU for the IAB-node initiates the simultaneous reception by scheduling a child MT on the child UL or a UE on the access UL, and, in parallel or consequently, the IAB-MT for the IAB-node indicates to the parent IAB-DU the desired K0, SLIV, beam/panel, etc. for a transmission on the parent DL. The IAB-parent then schedules on the parent DL accordingly by selecting a proper K0 for the PDSCH.

Figure 6C:
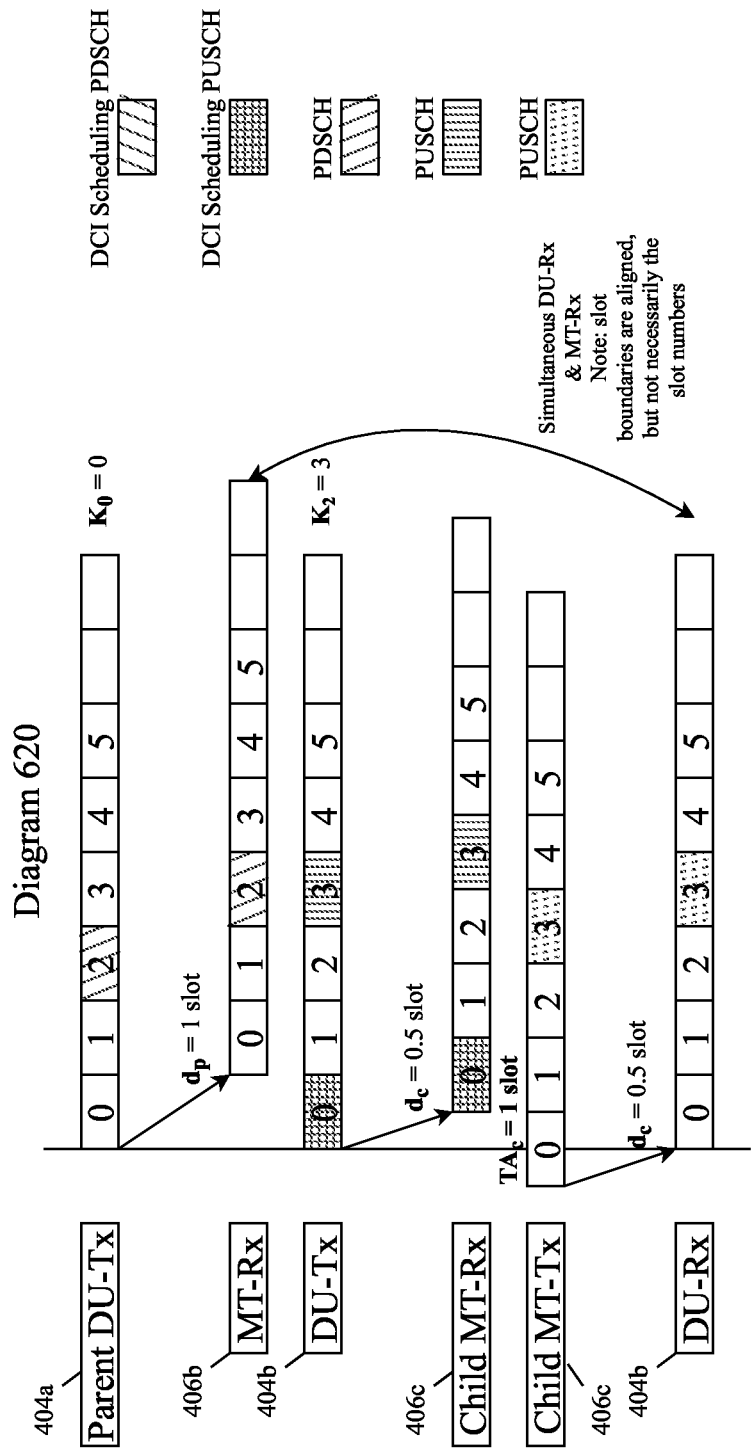

FIG. 6c shows a third slot diagram 620 for scheduling simultaneous reception at an IAB-node in an IAB arrangement. Similar to the slot diagrams 600 and 610, the third slot diagram 630 will be described with regard to the system 400 of FIG. 4. Similar to FIG. 6a above, the same cross-hatchings are used in the diagram 610 to show transmissions from one component and receptions at another component.

In the slot diagram 620, the IAB-node DU 404b schedules a PUSCH on the child DL 414, which is received at the child MT 406c, and the IAB-node 402b concurrently or subsequently indicates to the IAB-parent DU 404a the desired beam parameters for a reception on the parent DL 410. The parent/node propagation delay (dp) and the node/child propagation delay (dc) are 1 slot and 0.5 slot, respectively, similar to FIG. 6a.

In this embodiment, the IAB-parent 402a accepts the desired parameters indicated by the IAB-node DU 404b and transmits the PDSCH on the parent DL 410 in accordance therewith. The IAB-child MT 406c, having received the PUSCH scheduling, transmits on the scheduled PUSCH via the child UL 416. The PUSCH transmission on the child UL 416 is received at the IAB-node DU 404b simultaneously with the PDSCH transmission on the parent DL 410 being received at the IAB-node MT 406b.

For the options discussed above, resource inefficiency may result particularly if the propagation delay between parent IAB-DU and IAB-MT (dp) is large. Additionally, further specification may be necessary for option 2 to indicate to the parent IAB-DU about the desired reception parameters. The desired reception parameters may be indicated, for example, dynamically via a UCI transmission, semi-statically via MAC-CE, periodic SRS, or CG-PUSCH, or by performing a scheduling request (SR) or initiating a PRACH.

In another embodiment, to achieve a simultaneous reception within an IAB node (DU-Rx & MT-Rx), a two-step indication may be used.

In the first step, the IAB-parent indicates to the IAB-node parameters including an initial beam/panel (beam management parameters), K0, SLIV, transmit power, demodulation reference signal (DMRS) port (DL transmission parameters) etc., and a predetermined grace period within which the IAB-MT of the IAB-node can indicate its desired parameters. In the second step, the IAB-node-MT indicates its desired parameters (beam/panel, K0, SLIV, Tx power, DMRS port etc.) to the IAB-parent, for example, on a PUCCH indicated by DCI from the IAB-parent.

Figure 6D:
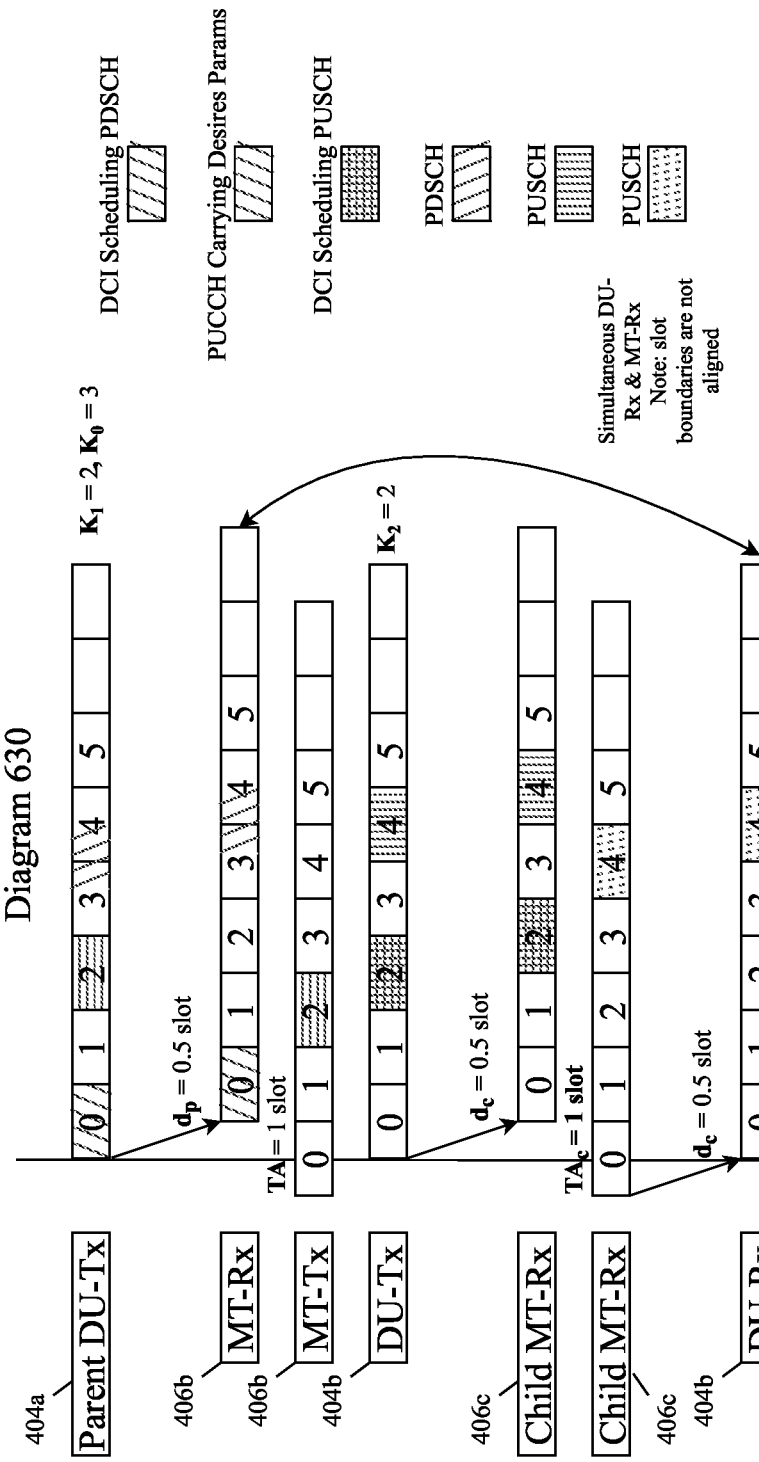

FIG. 6d shows a fourth slot diagram 630 for scheduling simultaneous reception at an IAB-node in an IAB arrangement. Similar to the slot diagrams 600-620, the fourth slot diagram 630 will be described with regard to the system 400 of FIG. 4. Similar to FIG. 6a above, the same cross-hatchings are used in the diagram 610 to show transmissions from one component and receptions at another component.

In the slot diagram 630, the IAB-parent DU 404a schedules a PDSCH by transmitting a DCI/PDCCH on the parent DL 410, which is received at the IAB-node MT 406b. Included in the DCI are a first set of desired beam parameters for the DL transmission. In response, the IAB-node MT 406b transmits a second set of desired beam parameters in slot 2 of the node MT-Tx frame for the DL transmission, which is received in slot 2 of the parent DU-Tx frame. Simultaneously with the transmission of the second set of parameters, the IAB-node MT 406b notifies the IAB-node DU 404b of the PDSCH from the IAB-parent 402a, assuming that the second set of parameters are used by the IAB-parent 402a.

The IAB-node DU 404b then schedules a PUSCH for the IAB-child MT 406c, similar to the first slot diagram 600 described above. If the second set of parameters are accepted by the IAB-parent DU 404a, then the PUSCH transmission on the child UL 416 is received at the IAB-node DU 404b simultaneously with the PDSCH transmission on the parent DL 410 being received at the IAB-node MT 406b.

The desired sets of beam parameters may be indicated in the following ways. In one option, the DCI may indicate K1 and PRI parameters for the PUCCH transmission, starting from the end of the DCI. Alternatively, the PUCCH resource and/or transmission offset from the end of the DCI may be RRC configured.

When the IAB-node responds to the IAB-parent with its own desired parameters, the IAB-MT may indicate its desired K0 as an offset to the slot in which the DCI was received or the slot in which the first PUCCH is transmitted. Alternatively, the IAB-MT may indicate its desired K0 as an offset to the initial K0 indicated by the parent IAB-DU.

The IAB-MT may send a HARQ-ACK on the PUCCH indicated by DCI, from the end of PDSCH. Alternatively, PUCCH resource and/or transmission offset from the end of PDSCH is RRC configured.

The choice between the different procedures described above can be based on communication link and/or priority. For example, when the IAB-DU schedules a UE on the access UL, it is initially assumed that the IAB-DU controls the process flow. However, if traffic to be scheduled on the parent DL is higher priority than the traffic child/access UE, then the parent IAB-DU may override the desired parameters received from the IAB-node and control the process flow.

The exemplary embodiments described above may be implemented by crossing the slot border for PDSCH on backhaul, for example for the case that PDSCH at MR-Rx is multiplexed with receptions at DU-Rx. If slot border crossing is allowed for the PDSCH, the SLIV indication and other procedure/mechanism may be adopted from Rel-16 Type-B PUSCH.

Methods

Figure 7A:
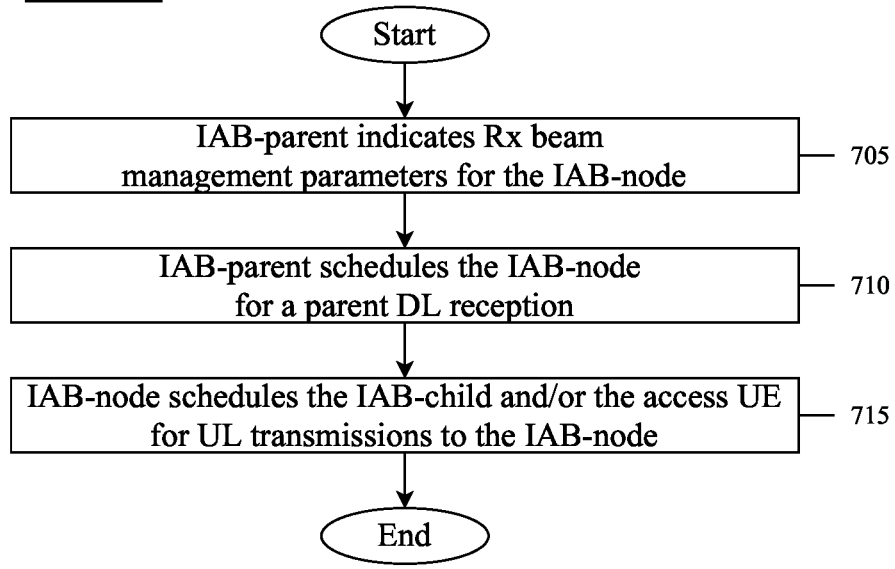
FIG. 7a shows a first method for configuring simultaneous reception (Rx) at an integrated access and backhaul (IAB) node where the process flow is initiated by an IAB-parent.

FIG. 7a shows a first method 700 for configuring simultaneous reception (Rx) at an integrated access and backhaul (IAB) node where the process flow is initiated by an IAB-parent. The method 700 will be described with respect to an IAB arrangement including a parent IAB-donor (IAB-parent), an IAB-node, a child IAB-node (IAB-child), and an access UE in communication with the IAB-node, similar to the IAB arrangement 400 shown above in FIG. 4. The method 700 relates to configuring simultaneous Rx for the IAB-node where the process flow is initiated by the IAB-parent.

In 705, the IAB-parent indicates Rx beam management parameters, e.g., beam/panel parameters, for the IAB-node. In one option, the IAB-parent indicates a unified TCJ framework that includes the reception beams/panels for all Rx links of the IAB-node, including the parent DL, the child UL and the access UL. In another option, the IAB-parent indicates only the Rx beams/panels for the parent DL, leaving the IAB-node to choose appropriate beam parameters for the IAB-child and/or the access UE so as to avoid interference with the parent DL.

The indication from the IAB-parent may be dynamic and/or semi-static. For example, the beam information may be indicated via the TCJ index in DCI for scheduling the PDSCH on the parent DL. In another example, the beam information may be indicated via MAC-CE/RRC or through the F1 interface in a periodic CSI-RS, SSB or SPS-PDSCH.

In 710, the IAB-parent schedules the IAB-node for a parent DL reception, e.g., a PDSCH. As noted above, the indication of step 705 may be included in the DCI scheduling the PDSCH. However, if the beam parameters are indicated separately, then the PDSCH scheduling will be performed separately. The PDSCH is scheduled so that the IAB-node has sufficient time to schedule the IAB-child and/or access UE for a UL transmission that may be received at the IAB-node simultaneously with the PDSCH, as described in detail above.

In 715, the IAB-node schedules the IAB-child and/or the access UE for UL transmissions to the IAB-node. The scheduling is performed with regard to the anticipated DL transmission from the IAB-parent to the IAB-node and is configured so that the UL transmissions from the IAB-child and/or access UE arrive simultaneously with the DL transmission from the IAB-parent, as described in detail above.

Figure 7B:
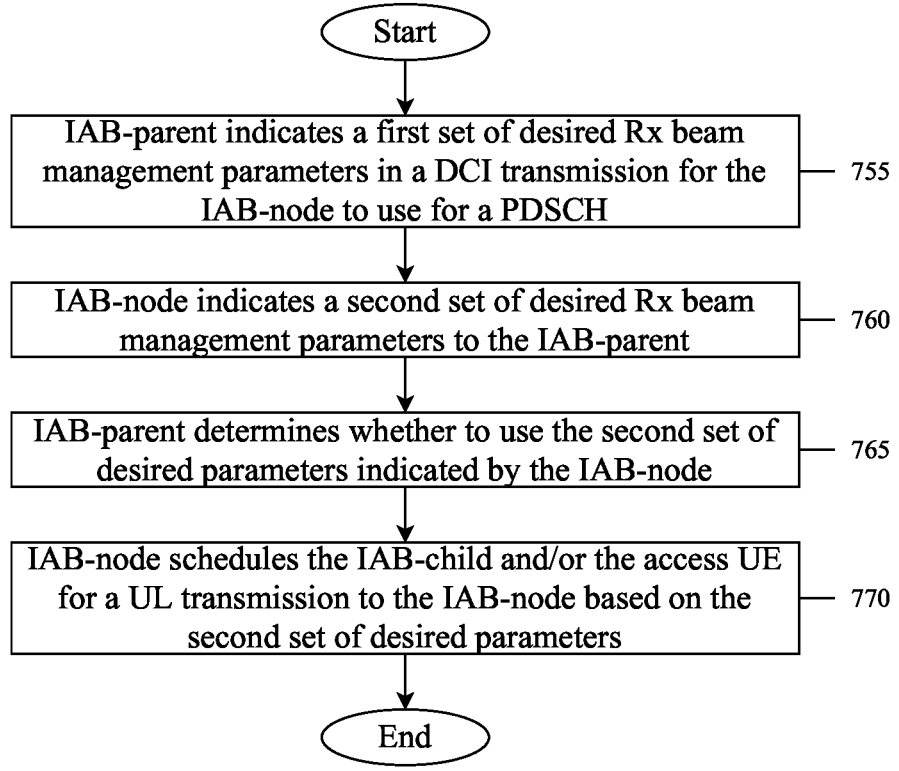
FIG. 7b shows a second method for configuring simultaneous reception (Rx) at an integrated access and backhaul (IAB) node where the process flow is initiated by an IAB-parent.

FIG. 7b shows a second method 750 for configuring simultaneous reception (Rx) at an integrated access and backhaul (IAB) node where the process flow is initiated by an IAB-parent. The method 750 describes an alternative embodiment to the method 700 discussed above.

In 755, the IAB-parent indicates a first set of desired Rx beam management parameters, e.g., beam/panel parameters, in a DCI transmission for the IAB-node to use for a PDSCH. The step 755 is similar to the step 705 described above for the method 700. However, in 755, the indicated parameters are suggested parameters instead of directly configured parameters. The indicated parameters may include an initial beam/panel, K0, SLIV, etc. and a predetermined grace period within which the IAB-node may respond with its desired parameters.

In 760, the IAB-node indicates a second set of desired Rx beam management parameters to the IAB-parent. Step 760 may be performed via e.g., a PUCCH transmission to the IAB-parent that was also indicated in the DCI. The second set of desired Rx parameters may be indicated in various ways, e.g., as an offset to the slot in which the DCI was received, an offset to the slot in which the first PUCCH is transmitted, or an offset to the initial K0 indicated by the IAB-parent.

In 765, the IAB-parent determines whether to use the second set of desired parameters indicated by the IAB-node. In the absence of an IAB-parent transmission to the IAB-node overriding the parameters indicated by the IAB-node, the second set of desired parameters are to be used by the IAB-parent. However, if the IAB-parent determines to use the first set of desired parameters or some other parameters, then the IAB-parent may send a second DCI to schedule the DL transmission to the IAB-node.

The IAB-parent may determine to use parameters different from the IAB-node desired parameters for various reasons. In one embodiment, if the IAB-parent seeks to schedule traffic on the parent DL that is higher priority than the traffic from the child/access UE, then the IAB-parent may schedule the DL transmission without consideration for the IAB-child and/or access UE UL transmissions, which will be subsequently scheduled after the higher priority DL transmission from the IAB-parent.

In 770, the IAB-node schedules the IAB-child and/or the access UE for a UL transmission to the IAB-node based on the second set of desired parameters, concurrently with step 760. The UL scheduling is performed based on the assumption that the IAB-parent will accept the second set of desired parameters. Similar to the step 715 discussed above, the UL scheduling is configured so that the UL transmissions from the IAB-child and/or access UE arrive simultaneously with the DL transmission from the IAB-parent.

However, if the IAB-parent transmits a second DCI overriding the second set of desired parameters, then the IAB-node will prioritize the parent DL traffic and use the parameters from the second DCI. In such a scenario, the IAB-node will miss the UL transmissions from the IAB-child and/or access UE and will need to reschedule these transmissions at a later time.

Figure 8:
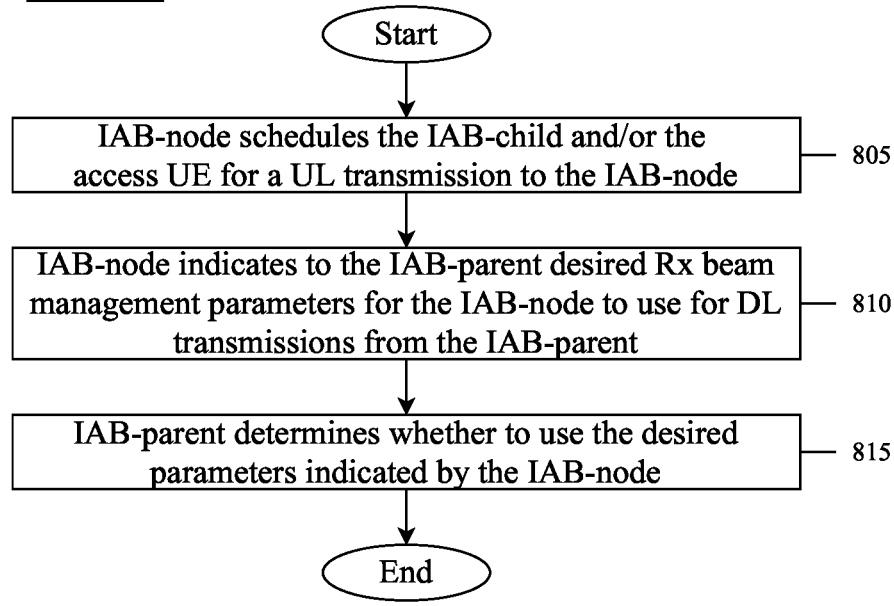
FIG. 8 shows a method for configuring simultaneous reception (Rx) at an integrated access and backhaul (IAB) node where the process flow is initiated by the IAB-node.

FIG. 8 shows a method 800 for configuring simultaneous reception (Rx) at an integrated access and backhaul (IAB) node where the process flow is initiated by the IAB-node. The method 800 will be described with respect to an IAB arrangement including a parent IAB-donor (IAB-parent), an IAB-node, a child IAB-node (IAB-child), and an access UE in communication with the IAB-node, similar to the IAB arrangement 400 shown above in FIG. 4. The method 800 relates to configuring simultaneous Rx for the IAB-node where the process flow is initiated by the IAB-node.

In 805, the IAB-node schedules the IAB-child and/or the access UE for a UL transmission to the IAB-node and indicates to the IAB-child and/or the access UE Tx beam management parameters, e.g., beam/panel parameters, to be used by the IAB-child and/or access UE for UL transmissions to the IAB-parent.

In 810, the IAB-node indicates to the IAB-parent desired Rx beam management parameters, e.g., beam/panel parameters, for the IAB-node to use for DL transmissions from the IAB-parent. Step 810 may be performed concurrently with or as a result of step 805.

Similar to step 760 of FIG. 7b, the IAB-node may indicate to the IAB-parent desired K0 and SLIV parameters for the parent DL transmission in addition to the beam management parameters. The indication to the IAB-parent may be dynamic and/or semi-static. For example, the beam information may be indicated via uplink control information (UCI) transmitted to the IAB-parent. In another example, the beam information may be indicated via MAC-CE or through the F1 interface in a periodic SRS or CG-PUSCH. In still another example, the beam information may be indicated in a scheduling request (SR) or a PRACH.

In 815, the IAB-parent determines whether to use the desired parameters indicated by the IAB-node. Similar to step 770 above, in the absence of an IAB-parent transmission overriding the parameters indicated by the IAB-node, the desired parameters are to be used by the IAB-parent. However, if the IAB-parent determines to use beam parameters different from the desired parameters, then the IAB-parent may send a second DCI to schedule the DL transmission to the IAB-node.

SDM with Case 6 Simultaneous Tx

To support simultaneous Tx, a simpler framework may be used. For simultaneous Tx, the IAB-parent may indicate the relevant parameters for a PUCCH transmission on the parent UL, and the IAB-node may schedule its Tx to the IAB-child or access UE in accordance therewith.

Figure 9:
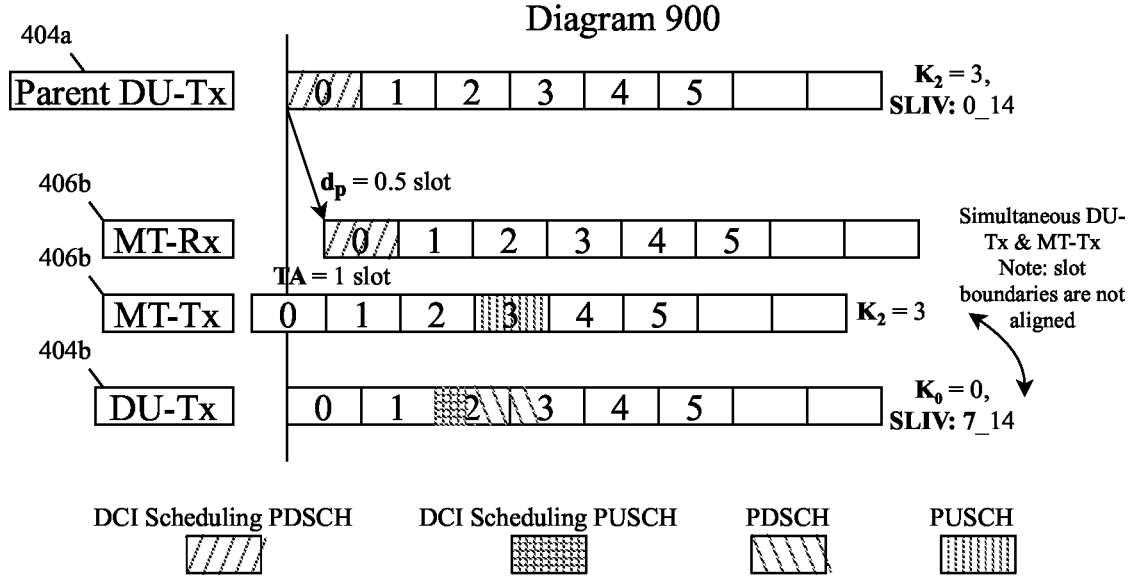
FIG. 9 shows a slot diagram for scheduling simultaneous transmission at an IAB-node in an IAB arrangement.

FIG. 9 shows a slot diagram 900 for scheduling simultaneous transmission at an IAB-node in an IAB arrangement. The diagram 600 will be described with regard to the system 400 of FIG. 4.

In the slot diagram 900, the IAB-parent DU 404a schedules a PUSCH on the parent UL 412, which is received at the IAB-node MT 406b. The IAB-node MT 406b notifies the IAB-node DU 404b. Then, the IAB-node MT 406b transmits on the parent UL 412 simultaneously with the IAB-node DU 404a transmitting a PDSCH on the child DL 414.

EXAMPLES

In a first example, a processor of a first next generation Node B (gNB) configured to perform operations is provided. The operations include establishing a first backhaul communication link with a second gNB, the second gNB having one of a second backhaul communication link with a third gNB or an access link with a user equipment (UE), receiving from the second gNB first beam management parameters for the first gNB to use for transmitting a downlink (DL) transmission to the second gNB on the first backhaul link and first DL transmission parameters, when the first beam management parameters and the first DL transmission parameters are determined to be used by the first gNB, scheduling the DL transmission for the second gNB so that the DL transmission will be received at the second gNB simultaneously with a UL transmission from at least one of the third gNB or the UE.

In a second example, the processor of the first example, wherein the first beam management parameters include beam and panel parameters for the first gNB to transmit the DL transmission to the second gNB.

In a third example, the processor of the first example, wherein the operations further comprise when the first beam management parameters and first DL transmission parameters are determined to not be used by the second gNB, indicating second beam management parameters and second DL transmission parameters to the second gNB for receiving the DL transmission from the first gNB.

In a fourth example, the processor of the first example, wherein the first beam management parameters are determined to not be used based on the first gNB having higher priority traffic to transmit to the second gNB on the DL than traffic to be transmitted to the second gNB on the UL.

In a fifth example, the processor of the first example, wherein the first beam management parameters are received dynamically in a UL control information (UCI) transmission from the second gNB, semi-statically, in a scheduling request or in a physical random access channel (PRACH).

In a sixth example, the processor of the first example, wherein the first DL transmission parameters include a DL transmit power and a DL demodulation reference signal (DMRS) port indication, wherein the UL transmission parameters further include a UL transmit power and a UL DMRS port indication, wherein the DL DMRS port and the UL DMRS port are configured to be orthogonal.

In a seventh example, the processor of the first example, wherein the indication of the first beam management parameters indicates a beam and a panel to be avoided by the first gNB to transmit the DL transmission.

In an eighth example, the processor of the first example, wherein the DL transmission received at the second gNB is spatial domain multiplexed with the at least one UL transmission received at the second gNB.

In a ninth example, the processor of the eighth example, wherein a slot border for a DL frame carrying the DL transmission at the second gNB is aligned with a slot border for a UL frame carrying the UL transmission at the second gNB.

In a tenth example, the processor of the eighth example, wherein a slot border for a DL frame carrying the DL transmission at the second gNB is not aligned with a slot border for a UL frame carrying the UL transmission at the second gNB.

In an eleventh example, the processor of the tenth example, wherein the DL transmission is a physical downlink shared channel (PDSCH) and wherein the PDSCH crosses the slot border for the DL frame.

In a twelfth example, a first next generation Node B (gNB) having a transceiver configured to communicate with one or more network gNBs and a processor communicatively coupled to the transceiver and configured to perform operations is provided. The operations include establishing a first backhaul communication link with a second gNB, the second gNB having one of a second backhaul communication link with a third gNB or an access link with a user equipment (UE), receiving from the second gNB first beam management parameters for the first gNB to use for transmitting a downlink (DL) transmission to the second gNB on the first backhaul link and first DL transmission parameters, when the first beam management parameters and the first DL transmission parameters are determined to be used by the first gNB, scheduling the DL transmission for the second gNB so that the DL transmission will be received at the second gNB simultaneously with a UL transmission from at least one of the third gNB or the UE.

In a thirteenth example, the first gNB of the twelfth example, wherein the first beam management parameters include beam and panel parameters for the first gNB to transmit the DL transmission to the second gNB.

In a fourteenth example, the first gNB of the twelfth example, wherein the operations further comprise when the first beam management parameters and first DL transmission parameters are determined to not be used by the second gNB, indicating second beam management parameters and second DL transmission parameters to the second gNB for receiving the DL transmission from the first gNB.

In a fifteenth example, the first gNB of the twelfth example, wherein the first beam management parameters are determined to not be used based on the first gNB having higher priority traffic to transmit to the second gNB on the DL than traffic to be transmitted to the second gNB on the UL.

In a sixteenth example, the first gNB of the twelfth example, wherein the first beam management parameters are received dynamically in a UL control information (UCI) transmission from the second gNB, semi-statically, in a scheduling request or in a physical random access channel (PRACH).

In a seventeenth example, the first gNB of the twelfth example, wherein the first DL transmission parameters include a DL transmit power and a DL demodulation reference signal (DMRS) port indication, wherein the UL transmission parameters further include a UL transmit power and a UL DMRS port indication, wherein the DL DMRS port and the UL DMRS port are configured to be orthogonal.

In a eighteenth example, the first gNB of the twelfth example, wherein the indication of the first beam management parameters indicates a beam and a panel to be avoided by the first gNB to transmit the DL transmission.

In a nineteenth example, the first gNB of the twelfth example, wherein the DL transmission received at the second gNB is spatial domain multiplexed with the at least one UL transmission received at the second gNB.

In a twentieth example, the first gNB of the eighteenth example, wherein a slot border for a DL frame carrying the DL transmission at the second gNB is aligned with a slot border for a UL frame carrying the UL transmission at the second gNB.

In a twenty first example, the first gNB of the eighteenth example, wherein a slot border for a DL frame carrying the DL transmission at the second gNB is not aligned with a slot border for a UL frame carrying the UL transmission at the second gNB.

In a twenty second example, the first gNB of the twenty first example, wherein the DL transmission is a physical downlink shared channel (PDSCH) and wherein the PDSCH crosses the slot border for the DL frame.

In a twenty third example, a first next generation Node B (gNB) having a transceiver configured to communicate with one or more network gNBs and a processor communicatively coupled to the transceiver and configured to perform operations is provided. The operations include establishing a first backhaul communication link with a second gNB, the second gNB having one of a second backhaul communication link with a third gNB or an access link with a user equipment (UE), indicating first beam management parameters for the second gNB to use for receiving a downlink (DL) transmission from the first gNB on the first backhaul link and first DL transmission parameters for the DL transmission, receiving second beam management parameters from the second gNB which modify the first beam management parameters and second DL transmission parameters which modify the first DL transmission parameters, determining whether to use the second beam management parameters and the second DL transmission parameters and when the second beam management parameters and the second DL transmission parameters are determined to be used, scheduling, for the second gNB, the DL transmission in accordance with the second beam management parameters and the second DL transmission parameters so that the DL transmission will be received at the second gNB simultaneously with a UL transmission from the at least one of the third gNB and the UE, wherein the UL transmission is scheduled by the second gNB using UL transmission parameters configured in dependence on the second DL transmission parameters.

In a twenty fourth example, the first gNB of the twenty third example, wherein the first and second beam management parameters include beam and panel parameters for receiving the DL transmission from the first gNB.

In a twenty fifth example, the first gNB of the twenty third example, wherein the operations further comprise indicating a physical uplink control channel (PUCCH) for the second gNB to transmit the second beam management parameters and the second DL transmission parameters.

In a twenty sixth example, the first gNB of the twenty fifth example, wherein the PUCCH is indicated in a downlink control information (DCI) or is radio resource control (RRC) configured.

In a twenty seventh example, the first gNB of the twenty sixth example, wherein the PUCCH is indicated by a K1 value and a PRI in the DCI, from the end of the DCI.

In a twenty eighth example, the first gNB of the twenty sixth example, wherein a K0 value indicated in the second DL transmission parameters is indicated as an offset to a slot in which the DCI was received, an offset to a slot in which the PUCCH is transmitted, or an offset to a K0 value indicated in the first DL transmission parameters.

In a twenty ninth example, the first gNB of the twenty third example, wherein the first and second DL transmission parameters include a DL transmit power and a DL demodulation reference signal (DMRS) port indication, wherein the UL transmission parameters further include a UL transmit power and a UL DMRS port indication, wherein the DL DMRS port and the UL DMRS port are configured to be orthogonal.

In a thirtieth example, the first gNB of the twenty third example, wherein the operations further comprise when the second DL transmission parameters are determined to not be used, scheduling the DL transmission to the second gNB in accordance with different beam management parameters without regard to simultaneous reception at the second gNB.

In a thirty first example, the first gNB of the thirtieth example, wherein the second DL transmission parameters are determined to not be used based on the first gNB having higher priority traffic to transmit to the second gNB on the DL than traffic to be transmitted to the second gNB on the UL.

In a thirty second example, the first gNB of the twenty third example, wherein the indication of the first or second beam management parameters indicates a beam and a panel to be avoided by the second gNB to receive the DL transmission.

In a thirty third example, the first gNB of the twenty third example, wherein the DL transmission received at the second gNB is spatial domain multiplexed with the at least one UL transmission received at the second gNB.

In a thirty fourth example, the first gNB of the thirtieth example, wherein a slot border for a DL frame carrying the DL transmission at the second gNB is aligned with a slot border for a UL frame carrying the UL transmission at the second gNB.

In a thirty fifth example, the first gNB of the thirtieth example, wherein a slot border for a DL frame carrying the DL transmission at the second gNB is not aligned with a slot border for a UL frame carrying the UL transmission at the second gNB.

In a thirty sixth example, the first gNB of the thirty fifth example, wherein the DL transmission is a physical downlink shared channel (PDSCH) and wherein the PDSCH crosses the slot border for the DL frame.

In a thirty seventh example, a first next generation Node B (gNB) having a transceiver configured to communicate with one or more network gNBs and a processor communicatively coupled to the transceiver and configured to perform operations is provided. The operations include establishing a first backhaul communication link with a second gNB as a parent gNB, establishing one of a second backhaul communication link with a third gNB as a child gNB or an access communication link with a user equipment (UE), receiving first beam management parameters from the second gNB for the first gNB to use for receiving a downlink (DL) transmission from the second gNB on the first backhaul link and first DL transmission parameters for the DL transmission, transmitting second beam management parameters to the second gNB which modify the first beam management parameters and second DL transmission parameters which modify the first DL transmission parameters, determining third beam management parameters for the first gNB to use for receiving an uplink (UL) transmission from at least one of the third gNB or the UE and UL transmission parameters for the UL transmission, scheduling the UL transmission for the at least one of the third gNB or the UE so that the UL transmission will be received at the first gNB simultaneously with the DL transmission from the second gNB, wherein the UL transmission is scheduled using the UL transmission parameters configured in dependence on the second DL transmission parameters.

In a thirty eighth example, the first gNB of the thirty seventh example, wherein the first and second beam management parameters include beam and panel parameters for receiving the DL transmission from the first gNB.

In a thirty ninth example, the first gNB of the thirty seventh example, wherein the operations further comprise receiving an indication for a physical uplink control channel (PUCCH) to transmit the second beam management parameters and the second DL transmission parameters.

In a fortieth example, the first gNB of the thirty ninth example, wherein the PUCCH is indicated in a downlink control information (DCI) or is radio resource control (RRC) configured.

In a forty first example, the first gNB of the fortieth example, wherein the PUCCH is indicated by a K1 value and a PRI in the DCI, from the end of the DCI.

In a forty second example, the first gNB of the fortieth example, wherein a K0 value indicated in the second DL transmission parameters is indicated as an offset to a slot in which the DCI was received, an offset to a slot in which the PUCCH is transmitted, or an offset to a K0 value indicated in the first DL transmission parameters.

In a forty third example, the first gNB of the thirty seventh example, wherein the first and second DL transmission parameters include a DL transmit power and a DL demodulation reference signal (DMRS) port indication, wherein the UL transmission parameters further include a UL transmit power and a UL DMRS port indication, wherein the DL DMRS port and the UL DMRS port are configured to be orthogonal.

In a forty fourth example, the first gNB of the thirty seventh example, wherein the operations further comprise when the second beam management parameters are determined by the second gNB to not be used for the DL transmission, receiving a downlink control information (DCI) scheduling the DL transmission to the second gNB in accordance with different beam management parameters without regard to simultaneous reception at the first gNB.

In a forty fifth example, the first gNB of the forty fourth example, wherein the second DL transmission parameters are determined to not be used based on the second gNB having higher priority traffic to transmit to the first gNB on the DL than traffic to be transmitted to the first gNB on the UL.

In a forty sixth example, the first gNB of the forty fourth example, wherein a slot border for a DL frame carrying the DL transmission at the first gNB is aligned with a slot border for a UL frame carrying the UL transmission at the first gNB.

In a forty seventh example, the first gNB of the forty fourth example, wherein a slot border for a DL frame carrying the DL transmission at the first gNB is not aligned with a slot border for a UL frame carrying the UL transmission at the first gNB.

In a forty eighth example, the first gNB of the forty seventh example, wherein the DL transmission is a physical downlink shared channel (PDSCH) and wherein the PDSCH crosses the slot border for the DL frame.

In a forty ninth example, the first gNB of the thirty seventh example, wherein the indication of the first or second beam management parameters indicates a beam and a panel to be avoided by the second gNB to send the DL transmission.

In a fiftieth example, the first gNB of the thirty seventh example, wherein the DL transmission received at the first gNB is spatial domain multiplexed with the at least one UL transmission received at the first gNB.

In a fifty first example, a first next generation Node B (gNB) having a transceiver configured to communicate with one or more network gNBs and a processor communicatively coupled to the transceiver and configured to perform operations is provided. The operations include establishing a first backhaul communication link with a second gNB as a parent gNB, establishing one of a second backhaul communication link with a third gNB as a child gNB or an access communication link with a user equipment (UE), scheduling at least one of the third gNB or the UE for an uplink (UL) transmission to the first gNB using UL beam management parameters and UL transmission parameters, indicating to the second gNB first beam management parameters for the second gNB to use for transmitting a downlink (DL) transmission to the first gNB on the first backhaul link and first DL transmission parameters for the DL transmission so that the DL transmission will be received simultaneously with the UL transmission and when the first beam management parameters and the first DL transmission parameters are determined to be used by the second gNB, receiving the DL transmission from the second gNB simultaneously with the UL transmission from the at least one of the third gNB or the UE.

In a fifty second example, the first gNB of the fifty first example, wherein the first beam management parameters include beam and panel parameters for receiving the DL transmission from the first gNB.

In a fifty third example, the first gNB of the fifty first example, wherein the operations further comprise when the first beam management parameters and first DL transmission parameters are determined to not be used by the second gNB, receiving second beam management parameters and second DL transmission parameters for receiving the DL transmission from the second gNB.

In a fifty fourth example, the first gNB of the fifty first example, wherein the first beam management parameters are determined to not be used based on the second gNB having higher priority traffic to transmit to the first gNB on the DL than traffic to be transmitted to the first gNB on the UL.

In a fifty fifth example, the first gNB of the fifty first example, the operations further comprising wherein the first beam management parameters are indicated dynamically in a UL control information (UCI) transmission from the first gNB, semi-statically, in a scheduling request or in a physical random access channel (PRACH).

In a fifty sixth example, the first gNB of the fifty first example, wherein the first DL transmission parameters include a DL transmit power and a DL demodulation reference signal (DMRS) port indication, wherein the UL transmission parameters further include a UL transmit power and a UL DMRS port indication, wherein the DL DMRS port and the UL DMRS port are configured to be orthogonal.

In a fifty seventh example, the first gNB of the fifty first example, wherein the indication of the first beam management parameters indicates a beam and a panel to be avoided by the second gNB to send the DL transmission.

In a fifty eighth example, the first gNB of the fifty first example, wherein the DL transmission received at the first gNB is spatial domain multiplexed with the at least one UL transmission received at the first gNB.

In a fifty ninth example, the first gNB of the fifty first example, wherein a slot border for a DL frame carrying the DL transmission at the first gNB is aligned with a slot border for a UL frame carrying the UL transmission at the first gNB.

In a sixtieth example, the first gNB of the fifty ninth example, wherein a slot border for a DL frame carrying the DL transmission at the first gNB is not aligned with a slot border for a UL frame carrying the UL transmission at the first gNB.

In a sixty first example, the first gNB of the sixtieth example, wherein the DL transmission is a physical downlink shared channel (PDSCH) and wherein the PDSCH crosses the slot border for the DL frame.

In a sixty second example, a processor of a first next generation Node B (gNB) configured to perform operations is provided. The operations include establishing a first backhaul communication link with a second gNB, the second gNB having one of a second backhaul communication link with a third gNB or an access link with a user equipment (UE), indicating first beam management parameters for the second gNB to use for receiving a downlink (DL) transmission from the first gNB on the first backhaul link and second beam management parameters for the second gNB to use for receiving an uplink (UL) transmission from at least one of the third gNB or the UE, scheduling, for the second gNB, the DL transmission using DL transmission parameters configured so that the DL transmission will be received at the second gNB simultaneously with a UL transmission from the at least one of the third gNB or the UE, wherein the UL transmission is scheduled by the second gNB using UL transmission parameters configured in dependence on the DL transmission parameters.

In a sixty third example, the processor of the sixty second example, wherein the first beam management parameters include beam and panel parameters for receiving the DL transmission from the first gNB and the second beam management parameters include beam and panel parameters for receiving the UL transmission from the at least one of the third gNB or the UE.

In a sixty fourth example, the processor of the sixty second example, wherein the operations further comprise determining the DL transmission parameters so that the second gNB has sufficient time to schedule the UL transmission to be received simultaneously with the DL transmission.

In a sixty fifth example, the processor of the sixty fourth example, wherein the DL transmission parameters include a K0 value and start and length indicator value (SLIV) configured so that the second gNB can schedule the UL transmission with a K2 value that fits within the K0 value.

In a sixty sixth example, the processor of the sixty fifth example, wherein the DL transmission parameters further include a DL transmit power and a DL demodulation reference signal (DMRS) port indication, wherein the UL transmission parameters further include a UL transmit power and a UL DMRS port indication, wherein the DL DMRS port and the UL DMRS port are configured to be orthogonal.

In a sixty seventh example, the processor of the sixty second example, wherein the first and second beam management parameters are signaled dynamically in a DL control information (DCI) scheduling the DL transmission or semi-statically.

In a sixty eighth example, the processor of the sixty second example, wherein the indication of the first beam management parameters indicates a beam and a panel to be avoided by the second gNB to receive the DL transmission.

In a sixty ninth example, the processor of the sixty second example, wherein the DL transmission received at the second gNB is spatial domain multiplexed with the at least one UL transmission received at the second gNB.

In a seventieth example, the processor of the sixty ninth example, wherein a slot border for a DL frame carrying the DL transmission at the second gNB is aligned with a slot border for a UL frame carrying the UL transmission at the second gNB.

In a seventy first example, the processor of the sixty eighth example, wherein a slot border for a DL frame carrying the DL transmission at the second gNB is not aligned with a slot border for a UL frame carrying the UL transmission at the second gNB.

In a seventy second example, the processor of the seventy first example, wherein the DL transmission is a physical downlink shared channel (PDSCH) and wherein the PDSCH crosses the slot border for the DL frame.

In a seventy third example, a first next generation Node B (gNB) having a transceiver configured to communicate with one or more network gNBs and a processor communicatively coupled to the transceiver and configured to perform operations is provided. The operations include establishing a first backhaul communication link with a second gNB, the second gNB having one of a second backhaul communication link with a third gNB or an access link with a user equipment (UE), indicating first beam management parameters for the second gNB to use for receiving a downlink (DL) transmission from the first gNB on the first backhaul link and second beam management parameters for the second gNB to use for receiving an uplink (UL) transmission from at least one of the third gNB or the UE, scheduling, for the second gNB, the DL transmission using DL transmission parameters configured so that the DL transmission will be received at the second gNB simultaneously with a UL transmission from the at least one of the third gNB or the UE, wherein the UL transmission is scheduled by the second gNB using UL transmission parameters configured in dependence on the DL transmission parameters.

In a seventy fourth example, the first gNB of the seventy third example, wherein the first beam management parameters include beam and panel parameters for receiving the DL transmission from the first gNB and the second beam management parameters include beam and panel parameters for receiving the UL transmission from the at least one of the third gNB or the UE.

In a seventy fifth example, the first gNB of the seventy third example, wherein the operations further comprise determining the DL transmission parameters so that the second gNB has sufficient time to schedule the UL transmission to be received simultaneously with the DL transmission.

In a seventy sixth example, the first gNB of the seventy fifth example, wherein the DL transmission parameters include a K0 value and start and length indicator value (SLIV) configured so that the second gNB can schedule the UL transmission with a K2 value that fits within the K0 value.

In a seventy seventh example, the first gNB of the seventy sixth example, wherein the DL transmission parameters further include a DL transmit power and a DL demodulation reference signal (DMRS) port indication, wherein the UL transmission parameters further include a UL transmit power and a UL DMRS port indication, wherein the DL DMRS port and the UL DMRS port are configured to be orthogonal.

In a seventy eighth example, the first gNB of the seventy third example, wherein the first and second beam management parameters are signaled dynamically in a DL control information (DCI) scheduling the DL transmission or semi-statically.

In a seventy ninth example, the first gNB of the seventy third example, wherein the indication of the first beam management parameters indicates a beam and a panel to be avoided by the second gNB to receive the DL transmission.

In an eightieth example, the first gNB of the seventy third example, wherein the DL transmission received at the second gNB is spatial domain multiplexed with the at least one UL transmission received at the second gNB.

In an eighty first example, the first gNB of the eightieth example, wherein a slot border for a DL frame carrying the DL transmission at the second gNB is aligned with a slot border for a UL frame carrying the UL transmission at the second gNB.

In an eighty second example, the first gNB of the seventy ninth example, wherein a slot border for a DL frame carrying the DL transmission at the second gNB is not aligned with a slot border for a UL frame carrying the UL transmission at the second gNB.

In an eighty third example, the first gNB of the eighty second example, wherein the DL transmission is a physical downlink shared channel (PDSCH) and wherein the PDSCH crosses the slot border for the DL frame.

In an eighty fourth example, a processor of a first next generation Node B (gNB) configured to perform operations is provided. The operations include establishing a first backhaul communication link with a second gNB as a parent gNB, a second backhaul communication link with a third gNB as a child gNB, and an access communication link with a user equipment (UE), receiving first beam management parameters from the second gNB for the first gNB to use for receiving a downlink (DL) transmission from the second gNB on the first backhaul link, determining second beam management parameters for the first gNB to use for receiving an uplink (UL) transmission from at least one of the third gNB or the UE, receiving a downlink control information (DCI) scheduling, for the first gNB, the DL transmission using DL transmission parameters, scheduling, for the at least one of the third gNB or the UE, a UL transmission using UL transmission parameters configured in dependence on the DL transmission parameters so that the UL transmission will be received at the first gNB simultaneously with the DL transmission from the first gNB.

In an eighty fifth example, the processor of the eighty fourth example, wherein the first beam management parameters include beam and panel parameters for receiving the DL transmission from the second gNB and the second beam management parameters include beam and panel parameters for receiving the UL transmission from the at least one of the third gNB or the UE, wherein the second gNB indicates the second beam management parameters to the first gNB directly.

In an eighty sixth example, the processor of the eighty fourth example, wherein the first beam management parameters include beam and panel parameters for receiving the DL transmission from the second gNB and the second beam management parameters include beam and panel parameters for receiving the UL transmission from the at least one of the third gNB or the UE, wherein the operations further comprise determining the second beam management parameters to avoid interference with the DL transmission.

In an eighty seventh example, the processor of the eighty fourth example, the operations further comprising determining the UL transmission parameters including a K2 value configured so that the UL transmission fits within a K0 value included in the DL transmission parameters.

In an eighty eighth example, the processor of the eighty seventh example, wherein the DL transmission parameters further include a DL transmit power and a DL demodulation reference signal (DMRS) port indication, wherein the UL transmission parameters further include a UL transmit power and a UL DMRS port indication, wherein the DL DMRS port and the UL DMRS port are configured to be orthogonal.

In an eighty ninth example, the processor of the eighty fourth example, wherein the first and second beam management parameters are signaled dynamically in a DL control information (DCI) scheduling the DL transmission or semi-statically.

In a ninetieth example, the processor of the eighty fourth example, wherein the indication of the first beam management parameters indicates a beam and a panel to be avoided by the first gNB to receive the DL transmission.

In a ninety first example, the processor of the eighty fourth example, wherein the DL transmission received at the first gNB is spatial domain multiplexed with the at least one UL transmission received at the first gNB.

In a ninety second example, the processor of the ninetieth example, wherein a slot border for a DL frame carrying the DL transmission at the first gNB is aligned with a slot border for a UL frame carrying the UL transmission at the first gNB.

In a ninety third example, the processor of the ninetieth example, wherein a slot border for a DL frame carrying the DL transmission at the first gNB is not aligned with a slot border for a UL frame carrying the UL transmission at the first gNB.

In a ninety fourth example, the processor of the ninety third example, wherein the DL transmission is a physical downlink shared channel (PDSCH) and wherein the PDSCH crosses the slot border for the DL frame.

In a ninety fifth example, a first next generation Node B (gNB) having a transceiver configured to communicate with one or more network gNBs and a processor communicatively coupled to the transceiver and configured to perform operations is provided. The operations include establishing a first backhaul communication link with a second gNB as a parent gNB, a second backhaul communication link with a third gNB as a child gNB, and an access communication link with a user equipment (UE), receiving first beam management parameters from the second gNB for the first gNB to use for receiving a downlink (DL) transmission from the second gNB on the first backhaul link, determining second beam management parameters for the first gNB to use for receiving an uplink (UL) transmission from at least one of the third gNB or the UE, receiving a downlink control information (DCI) scheduling, for the first gNB, the DL transmission using DL transmission parameters, scheduling, for the at least one of the third gNB or the UE, a UL transmission using UL transmission parameters configured in dependence on the DL transmission parameters so that the UL transmission will be received at the first gNB simultaneously with the DL transmission from the first gNB.

In an ninety sixth example, the first gNB of the ninety fifth example, wherein the first beam management parameters include beam and panel parameters for receiving the DL transmission from the second gNB and the second beam management parameters include beam and panel parameters for receiving the UL transmission from the at least one of the third gNB or the UE, wherein the second gNB indicates the second beam management parameters to the first gNB directly.

In an ninety seventh example, the first gNB of the ninety fifth example, wherein the first beam management parameters include beam and panel parameters for receiving the DL transmission from the second gNB and the second beam management parameters include beam and panel parameters for receiving the UL transmission from the at least one of the third gNB or the UE, wherein the operations further comprise determining the second beam management parameters to avoid interference with the DL transmission.

In an ninety eighth example, the first gNB of the ninety fifth example, the operations further comprising determining the UL transmission parameters including a K2 value configured so that the UL transmission fits within a K0 value included in the DL transmission parameters.

In an ninety ninth example, the first gNB of the ninety eighth example, wherein the DL transmission parameters further include a DL transmit power and a DL demodulation reference signal (DMRS) port indication, wherein the UL transmission parameters further include a UL transmit power and a UL DMRS port indication, wherein the DL DMRS port and the UL DMRS port are configured to be orthogonal.

In a one hundredth example, the first gNB of the ninety fifth example, wherein the first and second beam management parameters are signaled dynamically in a DL control information (DCI) scheduling the DL transmission or semi-statically.

In a one hundred first example, the first gNB of the ninety fifth example, wherein the indication of the first beam management parameters indicates a beam and a panel to be avoided by the first gNB to receive the DL transmission.

In a one hundred second example, the first gNB of the ninety fifth example, wherein the DL transmission received at the first gNB is spatial domain multiplexed with the at least one UL transmission received at the first gNB.

In a one hundred third example, the first gNB of the one hundred first example, wherein a slot border for a DL frame carrying the DL transmission at the first gNB is aligned with a slot border for a UL frame carrying the UL transmission at the first gNB.

In a one hundred fourth example, the first gNB of the one hundred first example, wherein a slot border for a DL frame carrying the DL transmission at the first gNB is not aligned with a slot border for a UL frame carrying the UL transmission at the first gNB.

In a one hundred fifth example, the first gNB of the one hundred fourth example, wherein the DL transmission is a physical downlink shared channel (PDSCH) and wherein the PDSCH crosses the slot border for the DL frame.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

The invention claimed is:

1. A processor of a first base station configured to perform operations comprising:
    establishing a first backhaul communication link with a second base station, the second base station having one of a second backhaul communication link with a third base station or an access link with a user equipment (UE);
    generating, for transmission to the second base station, a medium access control (MAC) control element (CE) indicating first beam management parameters for the second base station to use for receiving a downlink (DL) transmission from the first base station on the first backhaul link and first DL transmission parameters for the DL transmission, wherein the first beam management parameters include beam and panel parameters for receiving the DL transmission from the first base station;
    receiving second beam management parameters from the second base station which modify the first beam management parameters and second DL transmission parameters which modify the first DL transmission parameters;
    determining whether to use the second beam management parameters and the second DL transmission parameters; and
    when the second beam management parameters and the second DL transmission parameters are determined to be used, scheduling, for the second base station, the DL transmission in accordance with the second beam management parameters and the second DL transmission parameters so that the DL transmission will be received at the second base station simultaneously with a UL transmission from at least one of the third base station and the UE, wherein the UL transmission is scheduled by the second base station using UL transmission parameters configured in dependence on the second DL transmission parameters.

2. The processor of claim 1, wherein the second beam management parameters include beam and panel parameters for receiving the DL transmission from the first base station.

3. The processor of claim 1, wherein the operations further comprise:
    indicating a physical uplink control channel (PUCCH) for the second base station to transmit the second beam management parameters and the second DL transmission parameters.

4. The processor of claim 3, wherein the PUCCH is indicated in a downlink control information (DCI) or is radio resource control (RRC) configured.

5. The processor of claim 1, wherein the first and second DL transmission parameters include a DL transmit power and a DL demodulation reference signal (DMRS) port indication, wherein the UL transmission parameters further include a UL transmit power and a UL DMRS port indication, wherein the DL DMRS port and the UL DMRS port are configured to be orthogonal.

6. The processor of claim 1, wherein the operations further comprise:
when the second DL transmission parameters are determined to not be used, scheduling the DL transmission to the second base station in accordance with different beam management parameters without regard to simultaneous reception at the second base station.

7. The processor of claim 1, wherein the indication of the first or second beam management parameters indicates a beam and a panel to be avoided by the second base station to receive the DL transmission.

8. The processor of claim 1, wherein the DL transmission received at the second base station is spatial domain multiplexed with the at least one UL transmission received at the second base station.

9. The processor of claim 6, wherein a slot border for a DL frame carrying the DL transmission at the second base station is aligned with a slot border for a UL frame carrying the UL transmission at the second base station.

10. The processor of claim 6, wherein a slot border for a DL frame carrying the DL transmission at the second base station is not aligned with a slot border for a UL frame carrying the UL transmission at the second base station.

11. A processor of a first base station configured to perform operations comprising:
establishing a first backhaul communication link with a second base station as a parent base station;
establishing one of a second backhaul communication link with a third base station as a child base station or an access communication link with a user equipment (UE);
receiving, from the second base station, a medium access control (MAC) control element (CE) indicating first beam management parameters for the first base station to use for receiving a downlink (DL) transmission from the second base station on the first backhaul link and first DL transmission parameters for the DL transmission, wherein the first beam management parameters include beam and panel parameters for receiving the DL transmission from the first base station;
transmitting second beam management parameters to the second base station which modify the first beam management parameters and second DL transmission parameters which modify the first DL transmission parameters;
determining third beam management parameters for the first base station to use for receiving an uplink (UL) transmission from at least one of the third base station or the UE and UL transmission parameters for the UL transmission;
scheduling the UL transmission for the at least one of the third base station or the UE so that the UL transmission will be received at the first base station simultaneously with the DL transmission from the second base station, wherein the UL transmission is scheduled using the UL transmission parameters configured in dependence on the second DL transmission parameters.

12. The processor of claim 11, wherein the second beam management parameters include beam and panel parameters for receiving the DL transmission from the first base station.

13. The processor of claim 11, wherein the operations further comprise:
receiving an indication for a physical uplink control channel (PUCCH) to transmit the second beam management parameters and the second DL transmission parameters.

14. The processor of claim 11, wherein the first and second DL transmission parameters include a DL transmit power and a DL demodulation reference signal (DMRS) port indication, wherein the UL transmission parameters further include a UL transmit power and a UL DMRS port indication, wherein the DL DMRS port and the UL DMRS port are configured to be orthogonal.

15. The processor of claim 11, wherein the operations further comprise:
when the second beam management parameters are determined by the second base station to not be used for the DL transmission, receiving a downlink control information (DCI) scheduling the DL transmission to the second base station in accordance with different beam management parameters without regard to simultaneous reception at the first base station.

16. The processor of claim 11, wherein the indication of the first or second beam management parameters indicates a beam and a panel to be avoided by the second base station to send the DL transmission.

17. The processor of claim 11, wherein the DL transmission received at the first base station is spatial domain multiplexed with the at least one UL transmission received at the first base station.

* * * * *